(12) United States Patent
Murata et al.

(10) Patent No.: US 7,739,033 B2
(45) Date of Patent: Jun. 15, 2010

(54) INFORMATION PROCESSING DEVICE AND METHOD, PROGRAM, AND INFORMATION PROCESSING SYSTEM

(75) Inventors: Makoto Murata, Tokyo (JP); Tamaki Kojima, Tokyo (JP); Wenwu Zhao, Tokyo (JP); Ryu Aoyama, Kanagawa (JP); Brian Clarkson, Tokyo (JP)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 11/630,389

(22) PCT Filed: May 12, 2005

(86) PCT No.: PCT/JP2005/008689

§ 371 (c)(1),
(2), (4) Date: Sep. 27, 2007

(87) PCT Pub. No.: WO2006/001129

PCT Pub. Date: Jan. 5, 2006

(65) Prior Publication Data

US 2008/0019564 A1    Jan. 24, 2008

(30) Foreign Application Priority Data

Jun. 29, 2004    (JP)    ............... 2004-191307
Oct. 4, 2004    (JP)    ............... 2004-291392

(51) Int. Cl.
*G06F 19/00* (2006.01)
*G06F 7/00* (2006.01)
*G06K 9/00* (2006.01)
*G06K 9/18* (2006.01)

(52) U.S. Cl. ............ 701/207; 701/210; 701/211; 701/214; 382/103; 382/104; 382/113; 382/190; 715/885; 340/995.1

(58) Field of Classification Search ............ 382/103, 382/104, 113, 190; 701/207, 210, 211, 214; 348/207.1, 207.99; 340/995.1
See application file for complete search history.

(56) References Cited

U.S. PATENT DOCUMENTS 7,015,831 B2 * 3/2006 Karlsson et al. .......... 340/995.1
2001/0024513 A1 * 9/2001 Miyatake et al. ............ 382/103

(Continued)

FOREIGN PATENT DOCUMENTS

JP    2001-305210    10/2001

(Continued)

*Primary Examiner*—Khoi Tran
*Assistant Examiner*—Ian Jen
(74) *Attorney, Agent, or Firm*—Oblon, Spivak, McClelland, Maier & Neustadt, L.L.P.

(57) ABSTRACT

An information processing device and method, a program, and an information processing system, for location identification at small granularity with high accuracy are disclosed. A portable terminal has a camera in addition to a GPS module. In a location recognition model construction phase, a location recognition model is constructed from an image sequence taken by the camera, associated with location information collected by the GPS module and the like, and stored. In a location identification phase, the current location in a global area is identified by the GPS module, and the current location in a local area is identified on the basis of the location recognition model selected from the identification result and the image sequence obtained at the time. The present invention can be applied to portable terminals such as notebook type personal computers, PDAs and mobile telephones.

9 Claims, 21 Drawing Sheets

U.S. PATENT DOCUMENTS

| | | | |
|---|---|---|---|
| 2001/0036293 A1* | 11/2001 | Laumeyer et al. | 382/104 |
| 2001/0048755 A1* | 12/2001 | Wiens | 382/113 |
| 2001/0048815 A1* | 12/2001 | Nakajima et al. | 396/310 |
| 2001/0051850 A1* | 12/2001 | Wietzke et al. | 701/207 |
| 2001/0052861 A1* | 12/2001 | Ohmura et al. | 340/988 |
| 2002/0069013 A1* | 6/2002 | Navab et al. | 701/200 |
| 2002/0090143 A1* | 7/2002 | Endo et al. | 382/282 |
| 2002/0093541 A1* | 7/2002 | Schileru-Key | 345/855 |
| 2002/0141655 A1* | 10/2002 | Niemi et al. | 382/276 |
| 2003/0016869 A1* | 1/2003 | Laumeyer et al. | 382/190 |
| 2003/0044071 A1* | 3/2003 | Kaneko et al. | 382/190 |
| 2003/0075674 A1* | 4/2003 | Anderson et al. | 250/221 |
| 2003/0100316 A1* | 5/2003 | Odamura | 455/456 |
| 2003/0105587 A1* | 6/2003 | Kim | 701/214 |
| 2003/0193529 A1* | 10/2003 | Lee et al. | 345/856 |
| 2003/0193575 A1* | 10/2003 | Yoshioka | 348/207.99 |
| 2003/0224802 A1* | 12/2003 | Nir et al. | 455/456.1 |
| 2004/0004663 A1* | 1/2004 | Kahn et al. | 348/207.1 |
| 2004/0004737 A1* | 1/2004 | Kahn et al. | 358/1.15 |
| 2004/0049341 A1* | 3/2004 | Fujiwara | 701/210 |
| 2004/0059500 A1* | 3/2004 | Nakano | 701/211 |

FOREIGN PATENT DOCUMENTS

| | | |
|---|---|---|
| JP | 2003-111128 | 4/2003 |
| JP | 2004-077273 | 3/2004 |
| JP | 2004-117094 | 4/2004 |

* cited by examiner

GLOBAL AREA

GLOBAL AREA

RELIABILITY LEVEL IN SENSOR

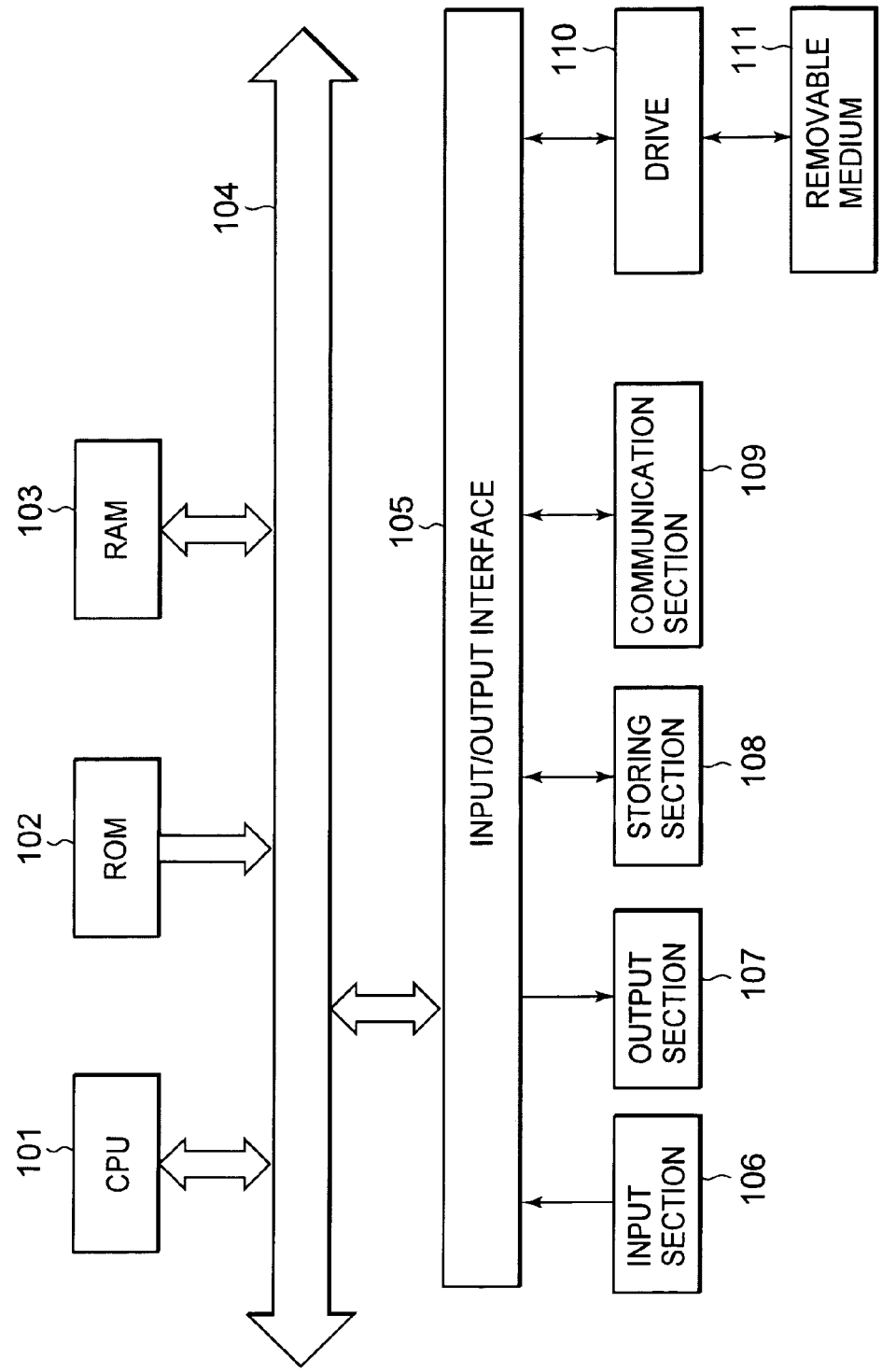

INFORMATION PROCESSING DEVICE AND METHOD, PROGRAM, AND INFORMATION PROCESSING SYSTEM

TECHNICAL FIELD

The present invention relates to an information processing device and method, a program, and an information processing system, and particularly, to an information processing device and method, a program, and an information processing system, for location identification at a small granularity with high accuracy.

Infrastructure-type location identification technologies which are prevailing include, for example, those using the GPS (Global Positioning System) and the PHS (Personal Handyphone System) (registered trademark).

Location identification using the GPS is performed on the basis of information from satellites which the GPS has caught, whereas location identification using the PHS is performed on the basis of information from a base station.

Using these types of location identification, a portable device incorporating a GPS module and a PHS module can specify the location of a user (the location of the device itself) at granularities ranging from some meters to some tens of meters. For example, the location of the user can be identified at a granularity such that the user stays at home, is in the office, or is at an intersection.

By the way, in Patent Document 1, a technique is disclosed that specifies the current location by using location information calculated by the GPS and location information specified on the basis of feature information of a captured image. Using this technique, location identification accuracy can be enhanced, compared with that using only location information acquired by the GPS or only location information specified from feature information about captured images.

[Patent Document 1] Japanese Patent Application Publication (KOKAI) No. 9-190413

DISCLOSURE OF THE INVENTION

Problems to be Solved by the Invention

However, due to its granularity being in the order of some meters to some tens of meters, the location identification using the GPS and the PHS can implement identification to the extent that the user stays at home, but not to the extent of which room in the home the user is in, whether in the living room, in the kitchen, in the dining room, or the like.

Similarly, such location identification can implement identification to the extent that the user is in the office, but not to the extent of which floor or which room in the office the user is in. Furthermore, if the user stays outdoors, identification can be implemented to the extent that the user is at a certain intersection, but not to the extent that he or she is about to cross or has already crossed the intersection.

Namely, there has been a problem that the location of the user cannot be specified at a small granularity, i.e., on such a level as to be close to the user's current situation.

Even using the technique disclosed in the Patent Document 1, a location on a minute level such as "a meeting room of a company A" can be specified. However, this is obtained by assigning weights to (by comprehensively judging) location identification results based on images, on the basis of location information obtained by the GPS (for example, FIG. 8). Namely, the location identification using the features of the images is performed directly. Thus, its location identification accuracy may likely be less reliable, compared with, for example, location identification performed by estimating an approximate current location using other information, and then by adaptively changing data (a model or the like prepared in equipment) for use in identification, according to the estimated current location.

Meanwhile, as referred to also in the Patent Document 1, in order to perform location identification from images obtained by an image input device, a user needs to prepare, in the device beforehand, data such as a model for recognition or the like, for example, by learning. Therefore, loads are heavy on the user for the learning and the like without which the location identification cannot be performed. In addition, in a place (location) where the user has visited for the first time, data for recognition is not prepared, and thus the location identification cannot be performed.

The present invention has been made in view of such circumstances, and is to enable location identification at a small granularity with high accuracy. Also, the present invention is to enable location identification from a captured image sequence, even for a place where the user has visited for the first time.

Means for Solving the Problems

A first information processing device of the present invention is characterized by having location measuring means which makes a location measurement, acquiring means which acquires data for recognition for performing location identification, on the basis of location information obtained by the location measurement made by the location measuring means, and location identification means which performs location identification by using the data for recognition acquired by the acquiring means and an output from a predetermined sensor.

The first information processing device of the present invention can be configured to further have creating means which creates the data for recognition on the basis of the output from the sensor.

The first information processing device of the present invention can be configured to further have storing means which stores the data for recognition created by the creating means by association with the location information obtained by the location measurement made by the location measuring means. In this case, the acquiring means acquires the data for recognition from the storing means on the basis of the location information obtained by the location measurement made by the location measuring means.

The first information processing device of the present invention can be configured to further have transmission means which transmits the data for recognition to another device.

The first information processing device of the present invention can be configured to further have receiving means which receives the data for recognition from such another device, and searching means which searches for the data for recognition on the basis of the location information. In this case, the transmission means transmits the data for recognition searched by the searching means to such another device.

The acquiring means can be configured to acquire the data for recognition from another device, in a case where the data for recognition corresponding to the location information obtained by the location measurement made by the location measuring means is not stored in the storing means.

The acquiring means can be configured to acquire the data for recognition at predetermined time intervals.

In a case where the location information obtained by the location measurement made by the location measuring means is represented by a predetermined location coordinate, and the location information stored in the storing means as associated with the data for recognition is represented by a predetermined location coordinate range, the acquiring means can be configured to acquire the data for recognition from such another device, when the location coordinate obtained by the location measurement made by the location measuring means exceeds the predetermined location coordinate range.

The location measuring means can be configured to make location measurements using a GPS and a PHS, and selects, from a location obtained by using the GPS and a location obtained by using the PHS, the location exhibiting a higher reliability level as a location measurement result.

The sensor can be configured to be formed of an imaging device of a camera or a plurality of photo-sensors.

A first information processing method of the present invention is characterized by including a location measuring step of making a location measurement, an acquiring step of acquiring data for recognition for performing location identification, on the basis of location information obtained by the location measurement made in the location measuring step, and a location identification step of performing location identification by using the data for recognition acquired in the acquiring step and an output from a predetermined sensor.

A first program of the present invention is characterized by causing a computer to perform processing including a location measuring step of making a location measurement, an acquiring step of acquiring data for recognition for performing location identification, on the basis of location information obtained by the location measurement made in the location measuring step, and a location identification step of performing location identification by using the data for recognition acquired in the acquiring step and an output from a predetermined sensor.

An information processing system of the present invention includes a first information processing device and a second information processing device. The system is characterized in that the first information processing device has location measuring means which makes a location measurement, transmission means which transmits location information obtained by the location measurement made by the location measuring means, to the second information processing device that stores data for recognition for performing location identification by association with the location information, receiving means which receives the data for recognition searched on the basis of the location information transmitted from the transmitting means, and transmitted thereto from the second information processing device, and location identification means which performs location identification by using the data for recognition received by the receiving means and an output from a predetermined sensor, and that the second information processing device has receiving means which receives the location information transmitted thereto from the first information processing device, searching means which searches for the data for recognition on the basis of the location information received by the receiving means, and transmission means which transmits the data for recognition searched by the searching means to the first information processing device.

A second information processing device of the present invention is characterized by having location measuring means which makes a location measurement on the basis of transmitted information, acquiring means which acquires data for recognition used when location identification based on an output from a predetermined sensor is performed, location identification means which performs the location identification based on the output from the predetermined sensor, by using the data for recognition acquired by the acquiring means, reliability level measuring means which measures a reliability level of a location obtained by the location measurement made by the location measuring means and a reliability level of a location identified by the location identification means, and location output means for outputting location representing information according to the reliability levels measured by the reliability level measuring means.

A second information processing method of the present invention is characterized by including a location measuring step of making a location measurement on the basis of transmitted information, an acquiring step of acquiring data for recognition used when location identification based on an output from a predetermined sensor is performed, a location identification step of performing the location identification based on the output from the predetermined sensor, by using the data for recognition acquired in the acquiring step, a reliability level measuring step of measuring a reliability level of a location obtained by the location measurement made in the location measuring step and a reliability level of a location identified in the location identification step, and a location output step of outputting location representing information according to the reliability levels measured in the reliability level measuring step.

A second program of the present invention is characterized by causing a computer to execute processing including a location measuring step of making a location measurement on the basis of transmitted information, an acquiring step of acquiring data for recognition used when location identification based on an output from a predetermined sensor is performed, a location identification step of performing the location identification based on the output from the predetermined sensor, by using the data for recognition acquired in the acquiring step, a reliability level measuring step of measuring a reliability level of a location obtained by the location measurement made in the location measuring step and a reliability level of a location identified in the location identification step, and a location output step of outputting location representing information according to the reliability levels measured in the reliability level measuring step.

In the first information processing device and method, and program of the present invention, a location measurement is made, and data for recognition for performing location identification is acquired on the basis of location information obtained by the location measurement. Furthermore, the location identification is performed by using the data for recognition acquired and an output from a predetermined sensor.

In the information processing system of the present invention, a location measurement is made, and location information obtained by the location measurement is transmitted to a second information processing device that stores data for recognition for performing location identification by association with the location information. In addition, the data for recognition searched on the basis of the location information transmitted, and transmitted from the second information processing device is received, and location identification is performed by using the data for recognition received and an output from a predetermined sensor. Furthermore, the location information transmitted from a first information processing device is received, and data for recognition is searched on the basis of the location information received, and the data for recognition searched is transmitted to the first information processing device.

In the second information processing device and method, and program of the present invention, a location measurement is made on the basis of transmitted information, and data for recognition used when location identification based on an output from a predetermined sensor is performed is acquired.

The location identification based on the output from the sensor is performed by using the data for recognition. The reliability level of a location obtained by the location measurement and the reliability level of a location recognized are measured, and location representing information is outputted according to the measured reliability levels.

ADVANTAGES OF THE INVENTION

According to the present invention, the current location can be identify at a small granularity.

Furthermore, according to the present invention, location identification can be performed even in a place where the user has visited for the first time.

BRIEF DESCRIPTION OF THE DRAWINGS

FIG. 1 is a diagram illustrating location identification performed using a portable terminal to which the present invention is applied.
FIG. 2 is a diagram illustrating a specific example of location identification.
FIG. 3 is a diagram illustrating another specific example of location identification.
FIG. 4 is a diagram illustrating how HMMs are shared.
FIG. 5 is a block diagram showing a hardware configuration example of the portable terminal.
FIG. 6 is a block diagram showing a functional configuration example of an information processing section in FIG. 5.
FIG. 7 is a block diagram showing a detailed configuration example of a registration managing section in FIG. 6.
FIG. 8 is a diagram illustrating an example of an HMM.
FIG. 9 is a diagram illustrating clustering and creation of HMMs.
FIG. 10 is another diagram illustrating clustering and creation of the HMMs.
FIG. 11 is still another diagram illustrating clustering and creation of the HMMs.
FIG. 12 is a block diagram showing a detailed configuration example of a location identification section in FIG. 6.
FIG. 13 is a diagram illustrating how a location measurement result is selected on the basis of reliability levels.
FIG. 14 is a diagram showing a detailed functional configuration example of an identification section in FIG. 12.
FIG. 15 is a diagram illustrating a Viterbi algorithm.
FIG. 16 is a flowchart for explaining location recognition model constructing processing.
FIG. 17 is a flowchart for explaining location identification processing.
FIG. 18 is a flowchart continued from FIG. 17 for explaining the location identification processing.
FIG. 19 is a flowchart for explaining identification processing performed in steps S27, S31 of FIG. 17 and step S38 of FIG. 18.
FIG. 20A is a diagram showing an example of the shape of the portable terminal.
FIG. 20B is a diagram showing another example of the shape of the portable terminal.
FIG. 20C is a diagram showing still another example of the shape of the portable terminal.
FIG. 20D is a diagram showing yet another example of the shape of the portable terminal.
FIG. 21A is another diagram showing an example of the shape of the portable terminal.
FIG. 21B is another diagram showing another example of the shape of the portable terminal.
FIG. 21C is another diagram showing still another example of the shape of the portable terminal.
FIG. 21D is another diagram showing yet another example of the shape of the portable terminal.
[FIG. 22]
FIG. 22 is a block diagram showing a configuration example of a personal computer.

Figure 1:
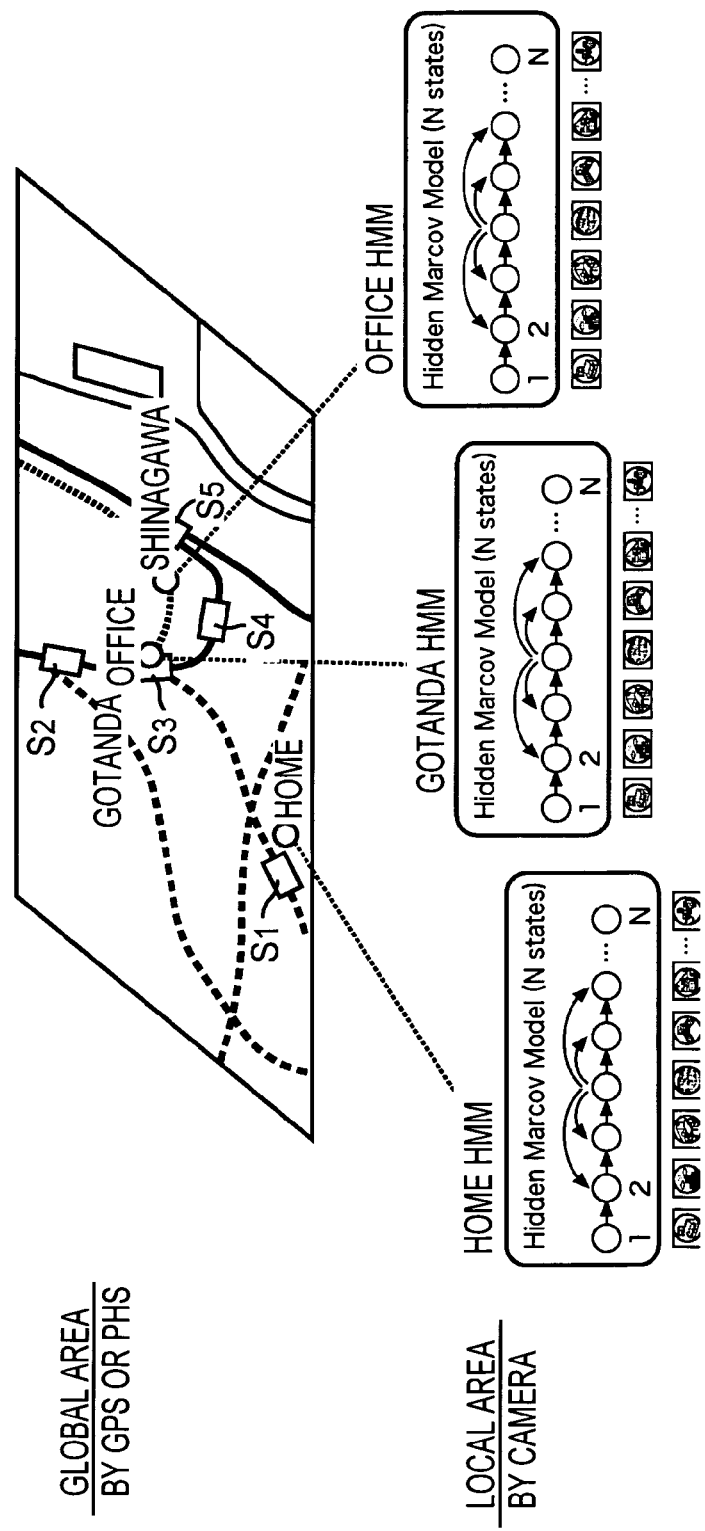
[FIG. 1]

DESCRIPTION OF REFERENCE NUMERALS 1 portable terminal, 11 information processing section, 12 GPS module, 13 PHS module, 14 wireless LAN module, 15 camera, 31 location measurement control section, 32 registration managing section, 33 location recognition model DB, 34 imaging control section, 35 location identification section, 36 communication control section, 51 clustering section, 52 registration section, 53 model creating section, 61 reliability level determining section, 62 model acquiring section, 63 identification section, 64 identification result acquiring section, 71 image selecting section, 72 feature vector calculating section, 73 feature vector storing section, 74 matching processing section

BEST MODES FOR CARRYING OUT THE INVENTION

An embodiment of the present invention will be described below with reference to the drawings.

FIG. 1 is a diagram illustrating location identification performed by using a portable terminal to which the present invention is applied.

Figure 5:
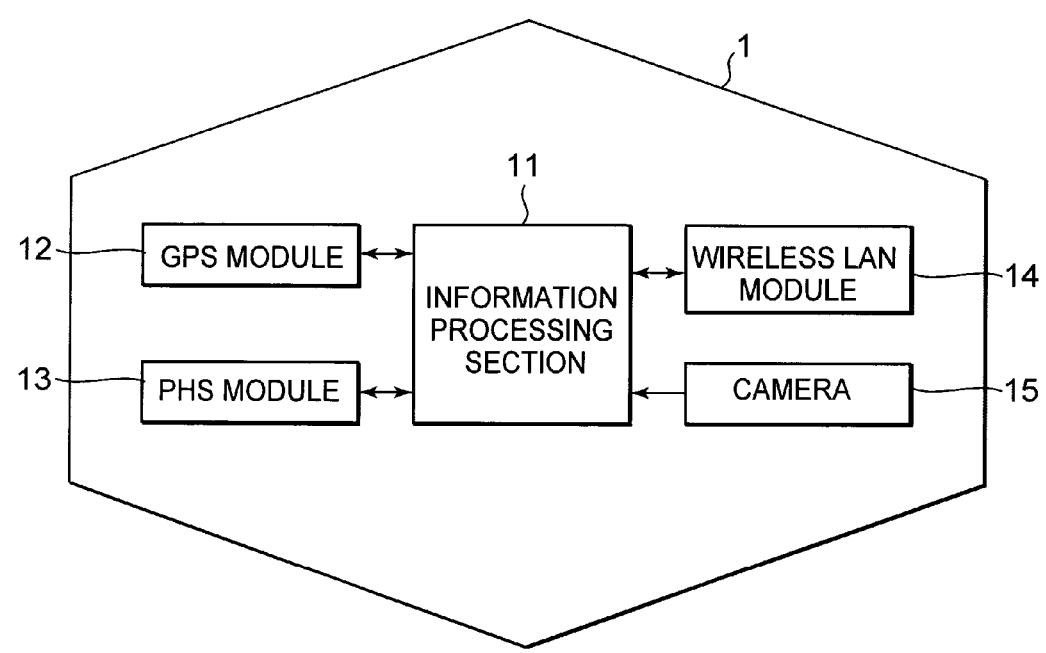
[FIG. 5]

The portable terminal is provided with location measuring devices such as a GPS module and a PHS module, and further, with a camera having, for example, a CCD (Charge Coupled Device) (FIG. 5 to be described later).

In this portable terminal, the current location of a user (portable terminal itself) in a global area is identified by the GPS module or the PHS module, and the current location of the user in a local area is identified on the basis of a location recognition model selected by an identification result and an image sequence obtained by the camera. The upper part of FIG. 1 illustrates location identification in the global area and the lower part illustrates location identification in the local area.

Here, the location in the global area means a location on a map, specified by longitude/latitude information acquired by the GPS module or the PHS module. Since the accuracy with which the longitude/latitude information acquired by the GPS module or the PHS module is in the order of some meters to some tens of meters, location identification by the GPS module or the PHS module alone can locate the user only roughly, to such an extent that the user is currently near "a certain station", near the "home", near the "office", or the like.

Furthermore, the location in the local area means a location at a smaller granularity inside "home", such as in the living room, in the kitchen, in the dining room, or in a bed room inside the "home", and similarly, a location at a smaller granularity inside the "office", such as on which floor, in which meeting room, or in front of the user's desk inside the "office".

In the portable terminal, locations at such a small granularity in the local area can be identified.

Location identification by the portable terminal basically includes a location recognition model construction phase and a location identification phase.

The location recognition model construction phase is a phase for creating a location recognition model being data (for example, parameters of an HMM (Hidden Markov Model), and feature quantities such as feature vectors obtained by feature extraction) used to perform location recognition from an image sequence obtained by the camera, whereas the location identification phase is a phase for actually performing location identification by using the location recognition model.

In the location recognition model construction phase, imaging is performed repeatedly at a predetermined frame rate, for example, at 15 frames per second, using the camera provided in the portable terminal, whereby landscapes at each of places the user is heading for are imaged.

As illustrated in FIG. 1, in a case where the user usually works at the "office" near "Gotanda" Station, an image sequence about the "home", an image sequence about the landscapes encountered during moving from the "home" to "Gotanda" and from "Gotanda" to the "office", and an image sequence in the "office" are obtained by the portable terminal. In FIG. 1, rectangles denoted by $S_1$ to $S_5$ represent train stations, respectively, wherein $S_3$ represents "Gotanda Station" and $S_5$ represents "Shinagawa Station".

Location recognition models are created by the portable terminal from the thus obtained image sequences. The created location recognition models are stored in the portable terminal, to become usable in the location identification phase. Therefore, the more the user moves around, the more the models are created to make more locations identifiable, since imaging is repeated at places where the user goes.

Note that each of the created location recognition models is stored in the portable terminal so as to be associated with the corresponding longitude/latitude (a cluster (which will be described later) including the location specified by the longitude/latitude) identified by the GPS module or the PHS module when the image sequence from which the model was created was obtained by the camera.

In FIG. 1, it is illustrated that a Home HMM (lower left) being a model created from the image sequence obtained by the camera when the user moved inside and near the "home", a Gotanda HMM (lower middle) being a model created from the image sequence obtained by the camera when the user moved inside or near the "Gotanda" Station yard, and an Office HMM (lower right) being a model created from the image sequence obtained by the camera when the user moved inside or near the "office" are created by the portable terminal, and stored in the portable terminal in association with their longitude/latitude information.

As described later in detail, for example, the states of each of these HMMs created and managed by the portable terminal are associated with the corresponding images (actually, their feature quantities) obtained by the camera, respectively. Such models are used in the location recognition phase.

In the location identification phase, first, longitude/latitude information representing the current location in the global area is acquired by the GPS module and the PHS module, and an HMM (an HMM stored in association with a cluster including the current location) stored as a model for the location nearest to the current location is selected from among the HMMs created in the location recognition model construction phase, on the basis of the acquired longitude/latitude information.

And, using the selected HMM and on the basis of an image sequence obtained by imaging landscapes at the current location with the camera, the current location of the user in the local area is to be identified.

Figure 2:
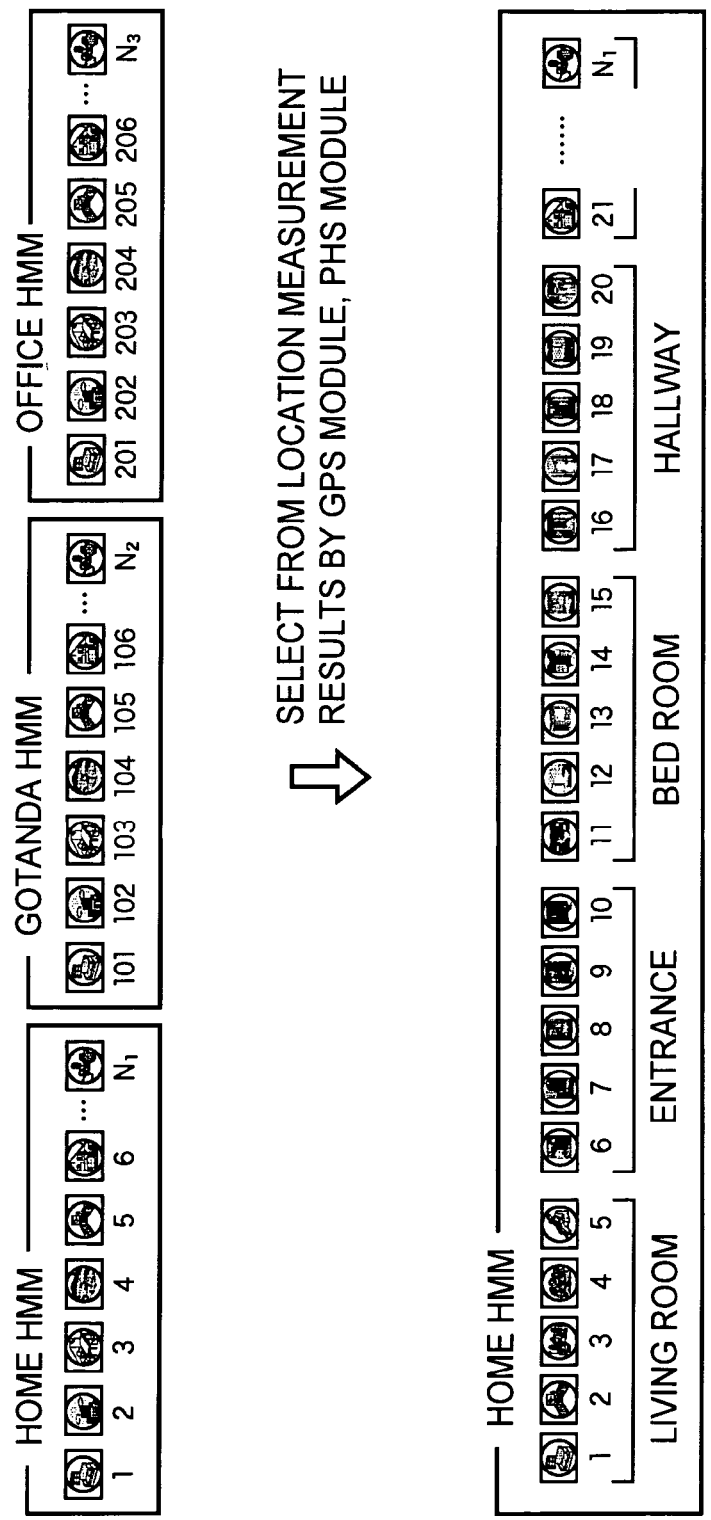
[FIG. 2]
Figure 3:
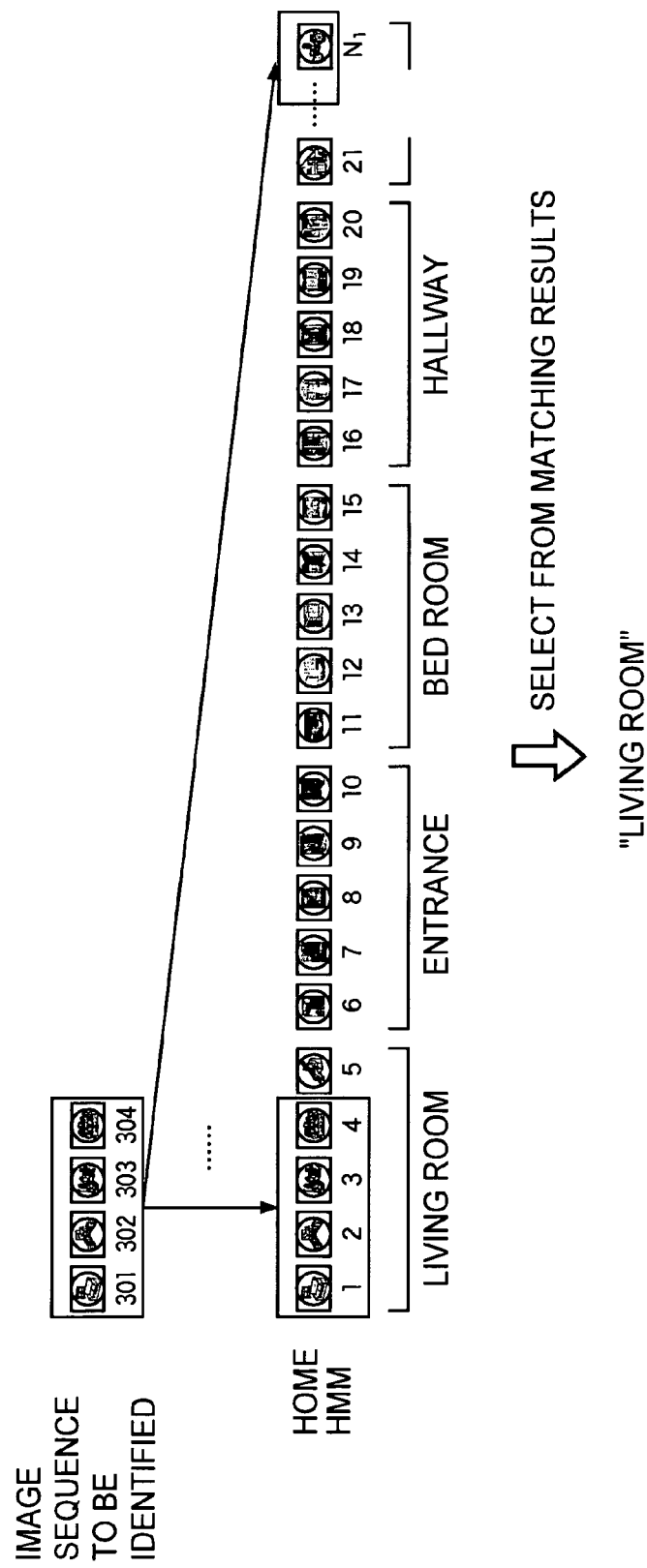
[FIG. 3]

Referring here to FIGS. 2 and 3, a specific example of processing performed in the location identification phase will be described.

As illustrated in FIG. 2, let it be supposed, for example, that the three HMMs, i.e., the Home HMM, the Gotanda HMM, and the Office HMM of FIG. 1, are stored in the portable terminal. In the example of FIG. 2, the states of the Home HMM correspond to images 1 to $N_1$, respectively; the states of the Gotanda HMM correspond to images 101 to $N_2$, respectively; and the states of the Office HMM correspond to images 201 to $N_3$, respectively.

The Home HMM, Gotanda HMM, and Office HMM each are associated with a cluster determined from the result of a location measurement made by the GPS module or the PHS module at the time the images used for creating the HMM were obtained by the camera (in the location recognition model construction phase).

Under such conditions, in the location identification phase, first; the current location of the user in the global area is measured by the GPS module and the PHS module, and an HMM associated with a cluster including the current location specified by longitude/latitude obtained by the location measurement is now selected as an HMM to be used for location identification in the local area.

In the example of FIG. 2, an HMM associated with a cluster including the current location obtained by the GPS module or the PHS module is the Home HMM, and as shown by an open arrow, the Home HMM is now selected as the HMM to be used for location identification in the local area, from among the three HMMs, i.e., the Home HMM, Gotanda HMM, and Office HMM.

As shown by the open arrow of FIG. 2, the states of the Home HMM are associated with the images 1 to $N_1$, and the images 1-5 are named "living room"; the images 6-10 are named "entrance"; the images 11-15 are named "bed room"; the images 16-20 are named "hallway", and so on. Namely, the Home HMM is an HMM created from the images obtained by the camera in the "living room", the images obtained in the "entrance hall", the images obtained in the "bed room", and the images obtained in the "hallway", and so on, during the location recognition model construction phase.

Note that the names of the locations such as the "living room" are those set by the user who viewed the obtained images, for example, in the location recognition model construction phase.

As illustrated in FIG. 2, after the Home HMM has been selected from the location measurement result by the GPS module or the PHS module, the image sequence (the sequence of the images respectively corresponding to the states of the Home HMM) of the Home HMM selected is subjected to matching with an image sequence currently obtained by the camera, as illustrated in FIG. 3. The Home HMM of FIG. 3 is the same as the Home HMM of FIG. 2, and an image sequence being four images 301-304 above the Home HMM is the image sequence to be identified currently obtained by the camera.

Since the images 301-304 have just been obtained, the name set to an image sequence of the Home HMM including a row of images which is the same as a row of the images 301-304 (actually, a time series of the feature quantities of the images 301-304 as later described) becomes the name for the current location of the user in the local area.

In a case where the image sequence to be identified includes the four images 301-304 as illustrated in FIG. 3, for example, four images are selected from the start of the Home HMM at each time, and a row of the selected four HMM images is subjected to matching with a row of the images to be identified. In the example of FIG. 3, first, a row of the images 1-4 of the Home HMM is subjected to matching with the row of the images 301-304 to be identified. Then, the images 2-5 of the Home HMM selected by shifting one image are subjected to matching with the images 301-304 to be identified. Similarly, images of the Home HMM for matching with the images 301-304 to be identified are selected so as to be shifted sequentially one by one at a time, and the thus selected images of the Home HMM are subjected to matching with the images 301-304 to be identified.

If the images of the Home HMM judged to exhibit such a high level of matching with the row of the images 301-304 to be identified as to be the same as the row of the images 301-304 are, for example, the images 1-4, the current location of the user in the local area is to be identified as the "living room" which is the name set to the images 1-4, as shown by an open arrow of FIG. 3.

Similarly, for example, in a case where the user is in a meeting room of the "office", the Office HMM of FIG. 1 is selected from longitude/latitude information by the GPS module or the PHS module, and it is identified that the user is currently in the meeting room on the basis of the result of matching between a predetermined image sequence selected from the image sequence of the selected Office HMM and an image sequence to be identified which has just been obtained by the camera.

In this way, in the portable terminal, practically hierarchical location identification is performed which involves higher-level location identification by the GPS module or the PHS module, and lower-level location identification performed using an HMM selected from the location identification result and an image sequence obtained by the camera.

As a result of this, location identification is performed also on the basis of the image sequence obtained by the camera, and thus even a location at a small granularity can be identified, which may not be implemented by using only the GPS module or the PHS module.

Furthermore, the range of the HMM to be used in the lower-level location identification can be focused on the basis of the upper-level location identification by the GPS module or the PHS module, and thus identification accuracy can be enhanced compared with a case of, for example, location identification performed with respect to all the models.

Furthermore, location identification at a small granularity can be performed, and thus, by setting names to images constituting an HMM as illustrated in FIG. 2, the user can have information presented on the portable terminal, which is suitable for the user's situation at the time.

The user can have information presented which is appropriate for his or her current location in the local area such as in that, the user registers, in the portable terminal, a plan to do in the living room of his or her own home when out of home, and after arriving home, the user can have, for example, a message saying "You have a plan to do in the living room" outputted to the portable terminal. In the portable terminal, upon identification of the current location as being in the living room, the registered plan is read and presented.

Note that in a case where it is not necessary to present the recognized current location to the user, but it suffices to distinguish the current location for internal use only in the portable terminal, there is no need to set a name to the current location. Namely, each of the locations is distinguished by predetermined recognition information within the portable terminal, and processing appropriate for the distinguished location is performed.

By the way, in order to implement the above-mentioned hierarchical location identification, the user needs to store location recognition models in the portable terminal beforehand, and to do so, the user needs to move around various places while carrying the portable terminal with him or her.

This means that location identification cannot be performed in places where the user has not been before. However, in order to enable such location identification, it may be configured so that location recognition models are shared among users each having a portable terminal provided with a similar function.

Figure 4:
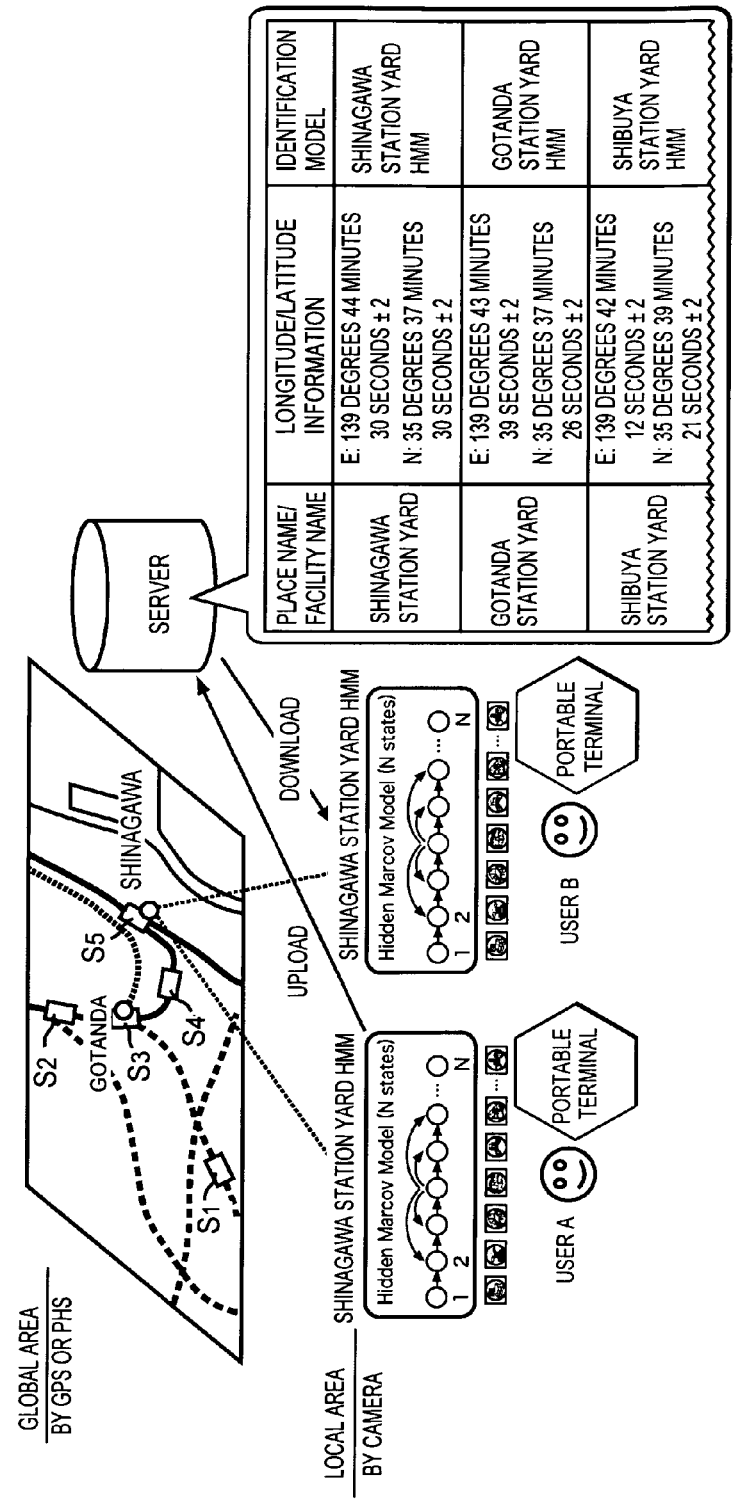
[FIG. 4]

FIG. 4 is a diagram illustrating how the location recognition models are shared.

For example, in a case where a user A in FIG. 4 moves in or near the "Shinagawa Station $S_5$ yard", while carrying a portable terminal, a Shinagawa station yard HMM being a location recognition model named "Shinagawa Station $S_5$ yard" is created in the portable terminal of the user A, in a way such as mentioned above. The created Shinagawa Station yard HMM is uploaded from the portable terminal of the user A to a predetermined server on a network, together with longitude/latitude information about Shinagawa Station $S_5$ acquired by the GPS module or the PHS module, for registration in association with the longitude/latitude information, and the place name/facility name and the like as a keyword. Note that location measurements made by the GPS module and the PHS module may have errors in the order of some meters to some tens of meters, and thus it is desirable to register the longitude/latitude information with some margin as shown in the drawing. In the example of FIG. 4, the longitude/latitude information associated with each of the Shinagawa Station yard HMM, a Gotanda Station HMM, and a Shibuya Station yard HMM are registered in the server with a range of ±2 seconds given with respect to reference locations, respectively.

As a result of this, the Shinagawa Station yard HMM becomes a resource to be shared with users of other portable terminals which have accessed the server.

Meanwhile, the portable terminal of a user B who has visited Shinagawa Station $S_5$ for the first time has not stored therein the Shinagawa Station yard HMM, and thus the user B can neither perform local-area location identification on the Shinagawa Station $S_5$ yard with, nor have information about Shinagawa Station $S_5$ presented on, his or her portable terminal.

At this time, if "Shinagawa Station" is inputted as a keyword for search into the portable terminal of the user B, or if the longitude/latitude information (longitude/latitude information about Shinagawa Station $S_5$) acquired by the GPS module or the PHS module is transmitted to the server, the Shinagawa Station yard HMM registered by the portable terminal of the user A is downloaded from the server. As a result, it becomes possible to perform location identification as to the Shinagawa Station $S_5$ yard also in the portable terminal of the user B.

The downloading of the location recognition model to the portable terminal of the user B may be performed by the user B manually transmitting a request for the location recognition model to the server, or may alternatively be performed automatically according to change of place or time in the portable terminal of the user B.

For example, in a case where the user B goes out of the Shinagawa Station yard to head for a new place, in order to navigate the user B from Shinagawa Station, a new location recognition model is needed. The portable terminal of the user B which has already acquired the Shinagawa Station yard HMM performs location identification by continuously using the Shinagawa Station yard HMM, as long as it stays within the range of the longitude/latitude registered as associated with the Shinagawa Station yard HMM, i.e., at longitude 139 degrees 44 minutes 30 seconds±2 seconds east and latitude 35 degrees 37 minutes 30 seconds±2 seconds north. However, in a case where the user B goes out of this range, i.e., if the current location measured using the GPS module or the PHS module goes beyond the range identifiable by the Shinagawa Station yard HMM held, location identification can no longer be performed. To overcome this situation, the portable terminal of the user B transmits longitude/latitude information about the current location to the server, to download a new HMM. This series of processing is repeated as appropriate until the user B reaches the new place.

Alternatively, it may be configured to repeat the downloading of a new HMM by transmitting the longitude/latitude information to the server at predetermined time intervals, without comparing the HMM already held with the longitude/latitude information measured.

Furthermore, the uploading of the location recognition model created in the portable terminal of the user A to the server may also be performed automatically as requested by a user who does not have that location recognition model, in the following way.

First, the server having received a request for the Shinagawa Station yard HMM from the portable terminal of the user B forwards the request for the HMM linked to longitude/latitude information about the portable terminal of the user B, to a plurality of terminals on the network. In any terminal having received the request, search is made for the HMM using the longitude/latitude information as a key, and the Shinagawa Station yard HMM is transmitted to the server from the portable terminal of the user A holding the requested HMM. The server having acquired the Shinagawa Station yard HMM associates the HMM with the longitude/latitude information thereby registering the HMM, and also transmits the Shinagawa Station yard HMM to the portable terminal of the user B.

As a result of this, the server can acquire the location recognition model instantly as requested by the user, without having to wait until the location recognition model is manually uploaded.

By configuring such that location recognition models are shared among users having portable terminals whose functions are similar to one another, even a user who is visiting a place for the first time can cause his or her own portable terminal to identify a location in the local area, to have information presented which is appropriate for the current location.

Operation of the portable terminal such as above will be described later with reference to flowcharts.

FIG. 5 is a block diagram showing a hardware configuration example of a portable terminal 1 that performs the hierarchical location identification.

As shown in FIG. 5, the portable terminal 1 is formed of a chassis that is, for example, hexagonal in cross-section. The chassis is supposed to have such a size that a user can hold it with one hand.

An information processing section 11 that controls the whole part of the portable terminal 1 has connected thereto, for example, a GPS module 12, a PHS module 13, a wireless LAN (Local Area Network) module 14, and a camera 15.

The information processing section 11 includes a CPU (Central Processing Unit), a ROM (Read Only Memory), and a RAM (Random Access Memory), and performs processing of identifying the current location in the global area by controlling the GPS module 12 and the PHS module 13, processing of identifying the current location in the local area on the basis of an image sequence obtained by the camera 15, and the like.

The GPS module 12 receives information transmitted thereto from satellites which the GPS has acquired, and outputs the information to the information processing section 11. The PHS module 13 receives information transmitted thereto from a base station with which it is communicating, and outputs the information to the information processing section 11. The wireless LAN module 14 connects to, for example, an external network via a nearby access point, to upload a location recognition model to or download a location recognition model from a server (the server of FIG. 4) on the network.

The camera 15 outputs an image sequence obtained thereby to the information processing section 11. The camera 15 may be incorporated into the portable terminal 1 such that its lens is exposed to the surface of the portable terminal 1, or may be provided as a device separate from the chassis of the portable terminal 1 such that even if the user puts the portable terminal 1 into a bag or a pocket, the user can obtain the images of surrounding landscapes. Furthermore, the lens of the camera 15 may include a wide-angle lens and a fish-eye lens, as will be described later.

Figure 6:
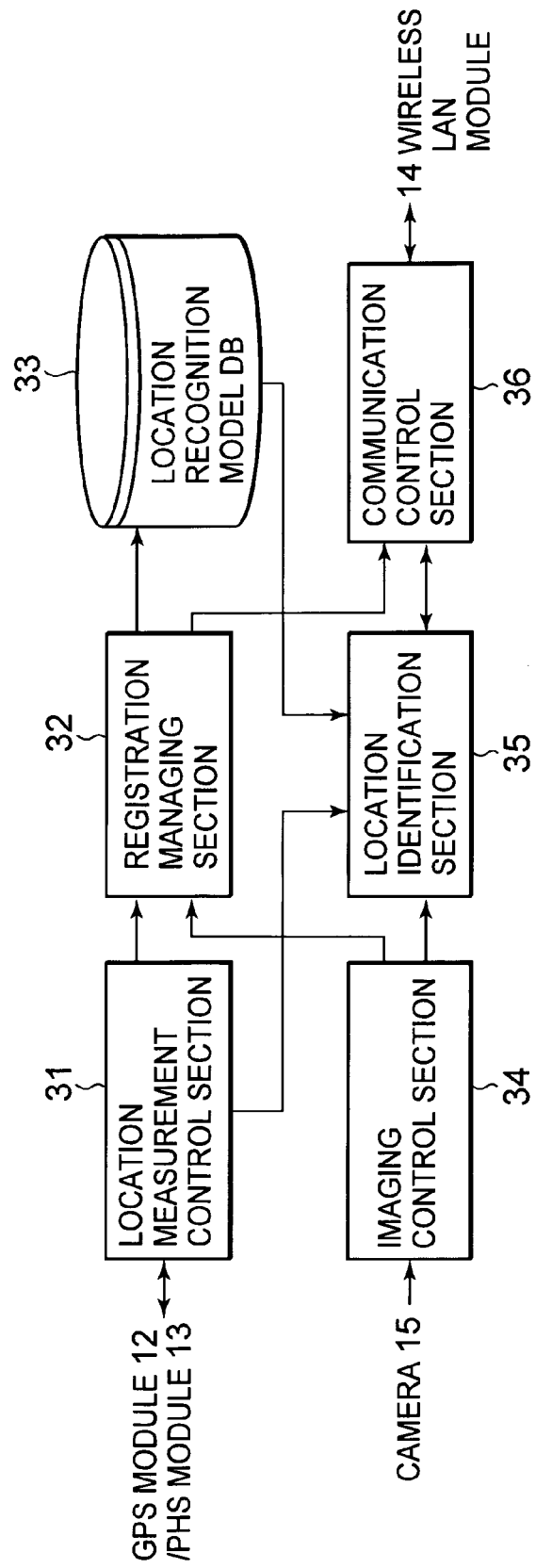
[FIG. 6]

FIG. 6 is a block diagram showing a functional configuration example of the information processing section 11.

At least part of the function sections in FIG. 6 is implemented by a predetermined program being executed by the CPU of the information processing section 11.

A location measurement control section 31 controls the GPS module 12 and the PHS module 13, to acquire longitude/latitude information in the global area on the basis of information supplied thereto from these location measuring devices. The longitude/latitude information obtained by the location measurement control section 31 is outputted to a registration managing section 32 when obtained in the location recognition model construction phase, and to a location identification section 35 when obtained in the location identification phase.

The registration managing section 32 creates an HMM being a location recognition model on the basis of an image sequence supplied thereto from an imaging control section 34, and associates the created HMM with information about a cluster obtained by clustering the longitude/latitude information supplied thereto from the location measurement control section 31, thereby storing in a location recognition model DB (database) 33. Furthermore, the registration managing section 32 outputs the HMM and the information about the cluster to a communication control section 36.

The location recognition model DB 33 stores HMMs created by the registration managing section 32. The HMMs stored therein are read as appropriate by the location identification section 35 for use in location identification.

The imaging control section 34 controls imaging by the camera 15, outputs the obtained image sequence to the registration managing section 32 when the imaging has taken place in the location recognition model construction phase, and outputs them to the location identification section 35 when the imaging has taken place in the location identification phase.

As described above with reference to FIG. 3, the matching by the portable terminal 1 is performed by, for example, checking a time series (change with time) of feature quantities between an image sequence to be identified and an image sequence selected from images associated with the states of an HMM. In this way, the matching involves only checking of images in terms of their change with time, and thus neither images to be identified nor images for creating an HMM are required to have a high resolution. Hence, images taken by the camera 15 and obtained by the imaging control section 34 may be converted into low-resolution images of 32×24 (left-to-right×top-to-bottom) pixels, for output to the registration managing section 32 and the location identification section 35.

Furthermore, in a case where a change in the pixel value is too large, matching accuracy drops, compared with a case where a change in the pixel value is relatively small. This is why the camera 15 uses a lens, such as a fish-eye lens, which is wider in angle. Supposing that images are in the same resolution (for example, 32×24), an image taken by the camera with a lens having a wider angle of view can have its pixel value change resulting from change in the orientation of the camera 15 suppressed, compared with an image taken by the camera with a lens having a narrower angle of view, thereby determination accuracy can be enhanced. Note that in FIGS. 1 to 4 mentioned above, a circle is depicted in each of one-frame images, and a landscape being a subject is depicted inside the circle. This indicates that the image is taken by the camera with a lens having a wide angle of view and that the landscape therein is distorted.

Returning to the description of FIG. 6, the location identification section 35 reads an HMM associated with a cluster including the current location from the location recognition model DB 33, on the basis of longitude/latitude information supplied thereto from the location measurement control section 31, and identifies the current location in the local area on the basis of the read HMM and an image sequence supplied thereto from the imaging control section 34. The information about the current location in the local area identified by the location identification section 35 is provided to, for example, an application that performs processing of presenting predetermined information according to the current location.

Furthermore, in a case where an HMM associated with a cluster including the current location is not stored in the location recognition model DB 33 since the current location is a place where the user has visited for the first time, the location identification section 35 outputs the longitude/latitude information to the communication control section 36, to download the HMM corresponding to the cluster including the current location from the server. On the basis of the HMM thus acquired from the server, identification of the current location in the local area is performed by the location identification section 35, similarly to the case where the HMM is acquired from the location recognition model DB 33.

The communication control section 36 controls the wireless LAN module 14, to upload the HMM and the information about the cluster supplied thereto from the registration managing section 32, to the server. Furthermore, the communication control section 36 downloads the HMM corresponding to the cluster including the current location represented by the longitude/latitude information, from the server, on the basis of the longitude/latitude information supplied thereto from the location identification section 35, and outputs it to the location identification section 35.

Figure 7:
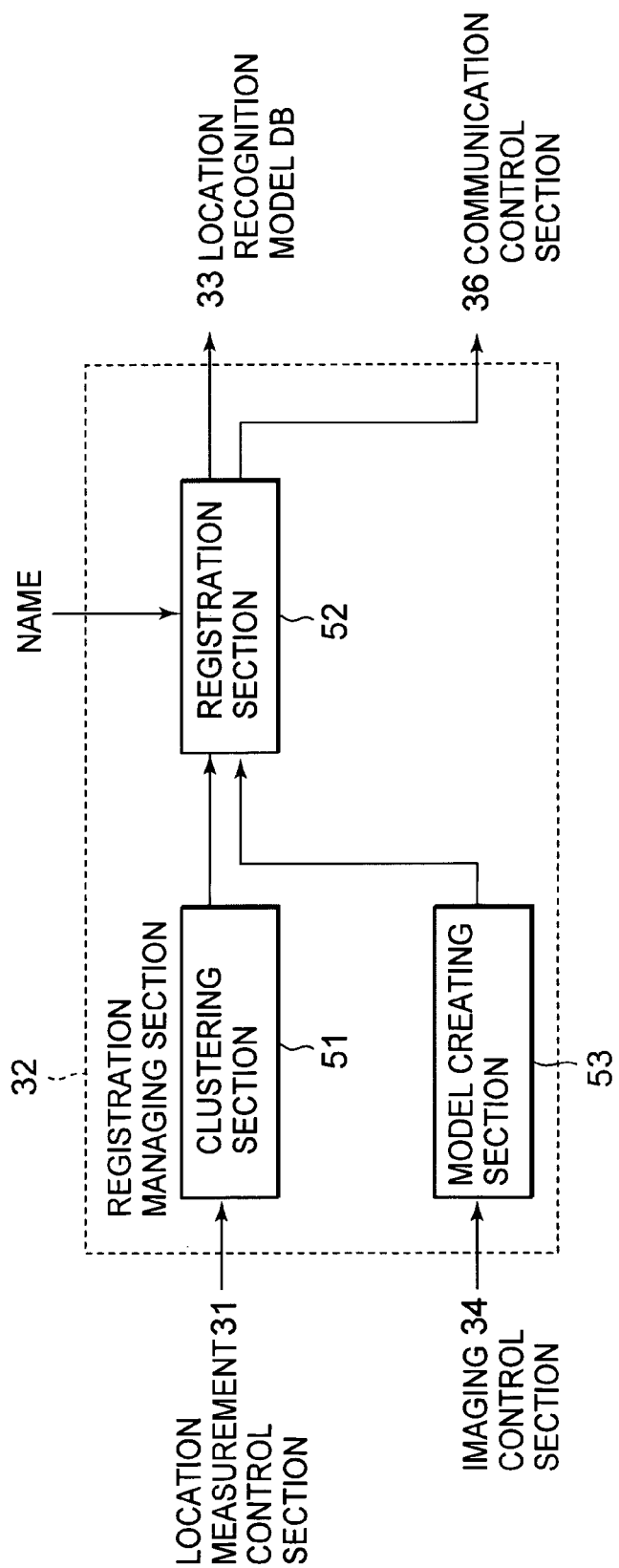
[FIG. 7]

FIG. 7 is a block diagram showing a detailed functional configuration example of the registration managing section 32 of FIG. 6.

The registration managing section 32 includes, for example, a clustering section 51, a registration section 52, and a model creating section 53.

The clustering section 51 performs clustering of the current location represented by longitude/latitude information supplied thereto from the location measurement control section 31, and outputs information about a cluster to which the current location belongs, to the registration section 52. The information about the cluster supplied to the registration section 52 includes information about a location serving as a reference for the cluster having a predetermined coverage, and information about the coverage.

The registration section 52 stores the cluster information supplied thereto from the clustering section 51, associating with the HMM supplied thereto from the model creating section 53, in the location recognition model DB 33, and also causes the communication control section 36 to transmit these pieces of information to the server on the network.

The model creating section 53 creates an HMM on the basis of an image sequence supplied thereto from the imaging control section 34, and outputs the created HMM to the registration section 52. Note that if the HMM has already been created as being associated with a certain cluster, the model creating section 53 learns (updates) that HMM on the basis of the image sequence supplied thereto from the imaging control section 34. The HMM resulting from the learning is supplied to the location recognition model DB 33 via the registration section 52, and is stored therein.

Here, the creation of an HMM by the model creating section 53 will be described.

The model creating section 53 creates an HMM from images which are not deemed unnecessary and which belong to an image sequence captured by the camera 15 in the location recognition model construction phase, excluding images deemed unnecessary for the creation of the HMM.

For example, the model creating section 53 compares an image Z currently acquired with an image $x_i$ selected last as not being unnecessary, in accordance with a below-described equation (1), and in a case where there is a difference equal to or greater than a predetermined threshold in terms of the non-similarity or time interval between these two images, the model creating section 53 selects the image Z currently acquired as an image for recognition.

[Equation 1]

$$\frac{D(x_{i-1}, z)}{D_{max}} < \rho e^{-\beta|t_i - t_z|} \quad (1)$$

$$\beta = \frac{ln2}{\Lambda\tau}$$

Here, $D_{max}$ is the maximum of $D(x_{i-1}, Z)$. A function D is defined by a later-described equation (3). Furthermore, $\rho$ is a change in percentage necessary for accepting an image $x_{i-1}$ and the image Z, and $\beta$ is a factor for adjusting the adaptation velocity. Predetermined values are set to $\rho$ and $\beta$. Furthermore, $t_{i-1}$ is the time at which the image $x_{i-1}$ has been acquired, and $t_z$ is the time at which the image Z has been acquired.

In this way, by selecting an image on the basis of the non-similarity or time interval between two images, images being exactly identical or substantially identical can be prevented from being successively selected, and thus a larger HMM which includes an efficiently large group of information usable for the matching processing can be generated within a limited storage capacity.

Figure 8:
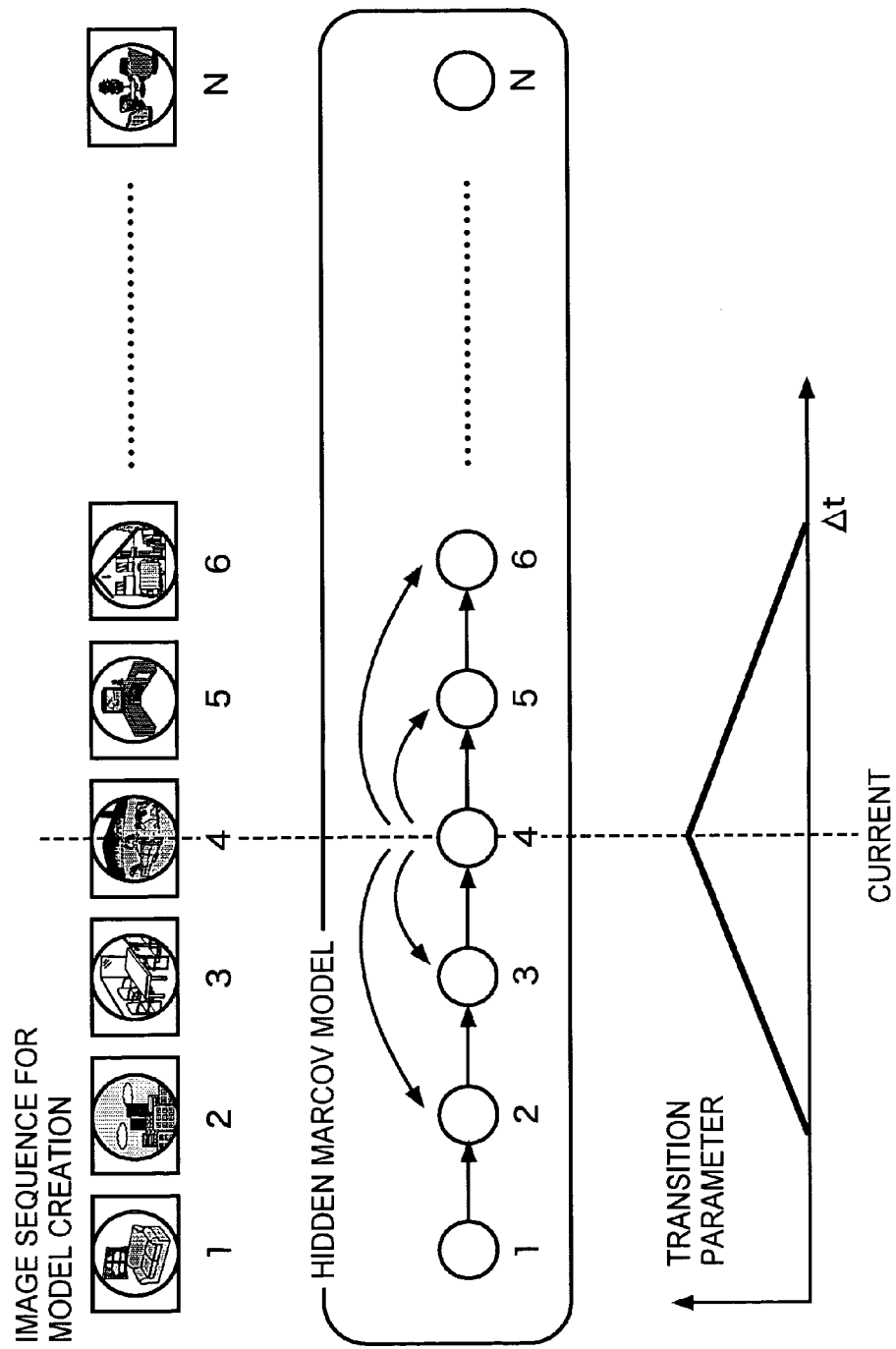
[FIG. 8]

FIG. 8 is a diagram illustrating an example of an HMM created by the model creating section 53.

As illustrated in FIG. 8, an HMM is created, which is configured such that N images taken by the camera in the location recognition model construction phase and selected as not being unnecessary correspond to states. Namely, a model used in the portable terminal 1 is not formed of, for example, parameters estimated from partially labeled data by using Expectation-Maximization or the like, but is formed by making the states of an HMM to correspond directly to images acquired in the location recognition model construction phase.

Furthermore, as illustrated in the lower part of FIG. 8, predetermined values are set as its transition parameters. In the graph of the transition parameters of FIG. 8, in which the vertical axis represents transition probability, and the horizontal axis represents measured distance in time between images (between states). For example, as illustrated in FIG. 8, values are set which are calculated on the basis of a Gaussian distribution in which the transition probability nears 0 with increasing distance. As a result of this, there is no need to perform optimization processing for transition parameters, thereby reducing processing loads.

The reason why the predetermined values are thus used as the transition parameters without involving learning as in ordinary cases is that the images corresponding to the states of an HMM are acquired time-sequentially, and thus it is assumed that the possibility of any image corresponding to a certain state (a state 4 in the case of FIG. 8) changing to an image corresponding to a state remote in time is small or zero.

Figure 9:
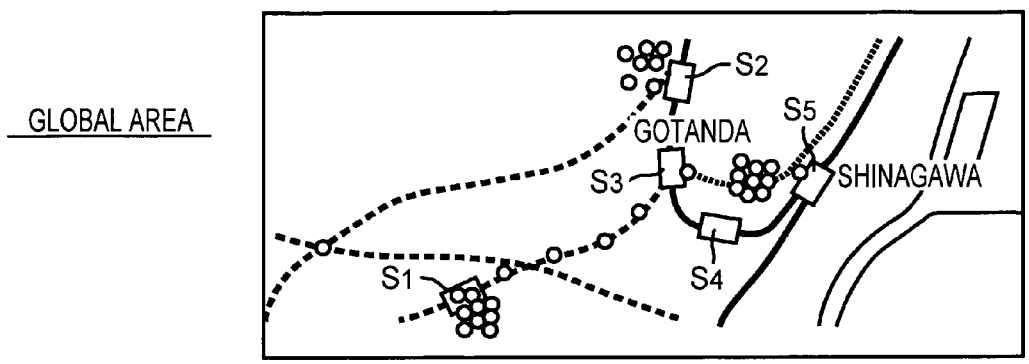
[FIG. 9]
Figure 10:
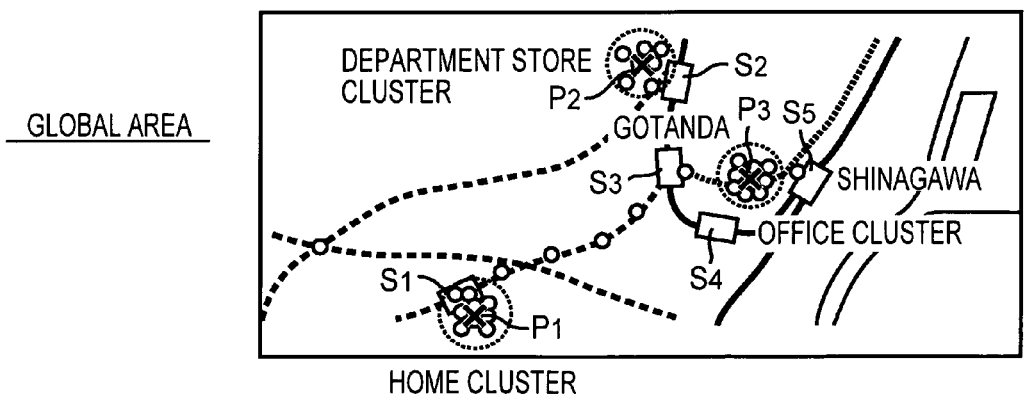
[FIG. 10]
Figure 11:
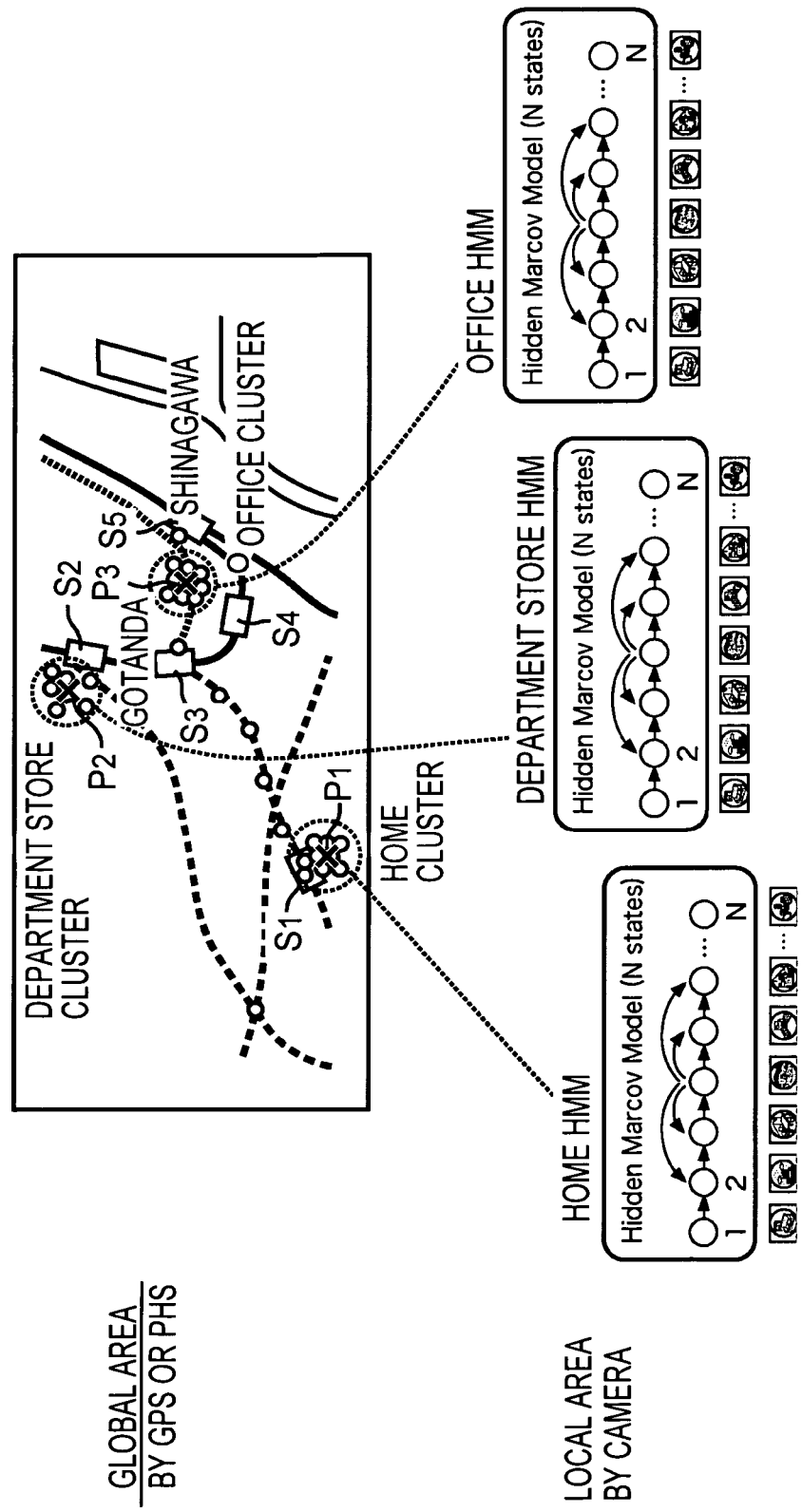
[FIG. 11]

FIGS. 9 to 11 are diagrams illustrating clustering by the thus configured registration section 32, and creation of HMMs. Note that the global area illustrated in each of FIGS. 9 to 11 is the one seen from right above, which was a bird's eye view in FIG. 1.

Let it now be supposed that the user usually works at the "office" near "Gotandal" as mentioned above, and often goes to a department store near a station $S_2$ on weekends. In addition, the user always carries the portable terminal 1.

In this case, since surrounding landscapes are imaged and location measurements are made by the GPS module and the like repeatedly, in a case where positions obtained by the measurements are to be plotted in the global area, the plotted positions cluster around three positions, that is, as illustrated in FIG. 9, for example, the home near a station $S_1$, the office near Gotanda Station $S_3$, and the department store near the station $S_2$. And image sequences obtained by the camera at these plotted positions are also collected.

Here, the clustering section 51 performs clustering using a predetermined technique on a plot such as illustrated in FIG. 9, and generates a Home cluster around a position $P_1$, a Department Store cluster around a position $P_2$, and an Office cluster around a position $P_3$, such as shown by circles depicted by dotted lines in FIG. 10. Note that captions "Home", "Department Store", and "Office" included in the names of these clusters are given for convenience in explanation.

Information representing the center positions (the position $P_1$, position $P_2$, position $P_3$) of the thus generated clusters, and the like are outputted to the registration section 52 as information about these clusters.

Meanwhile, the model creating section 53 creates HMMs to be used when location identification is performed within the clusters generated by the clustering section 51, on the basis of the image sequences taken by the camera at the corresponding plotted positions in FIG. 9, respectively, as mentioned above, and outputs the created HMMs to the registration section 52.

The registration section 52 associates the information about each of the clusters generated by the clustering section 51 and the HMM to be used within the cluster created by the model creating section 53 with each other and registers them in the location recognition model DB 33. In a case where the user defines a cluster name (the name of a place where images have been taken by the camera) and the names of the images belonging to the HMM, these names are also included in the information about the cluster.

As a result of this, as illustrated in FIG. 11, with regard to the Home cluster, associated therewith is the Home HMM which has been created from the image sequence taken by the camera at the plotted position included in that cluster. With regard to the Department Store cluster, associated therewith is a Department Store HMM which has been created from the image sequence obtained by the camera at the plotted position included in that cluster. In addition, with regard to the Office cluster, associated therewith is the Office HMM which has been created from the image sequence obtained by the camera at the plotted position included in that cluster.

Figure 12:
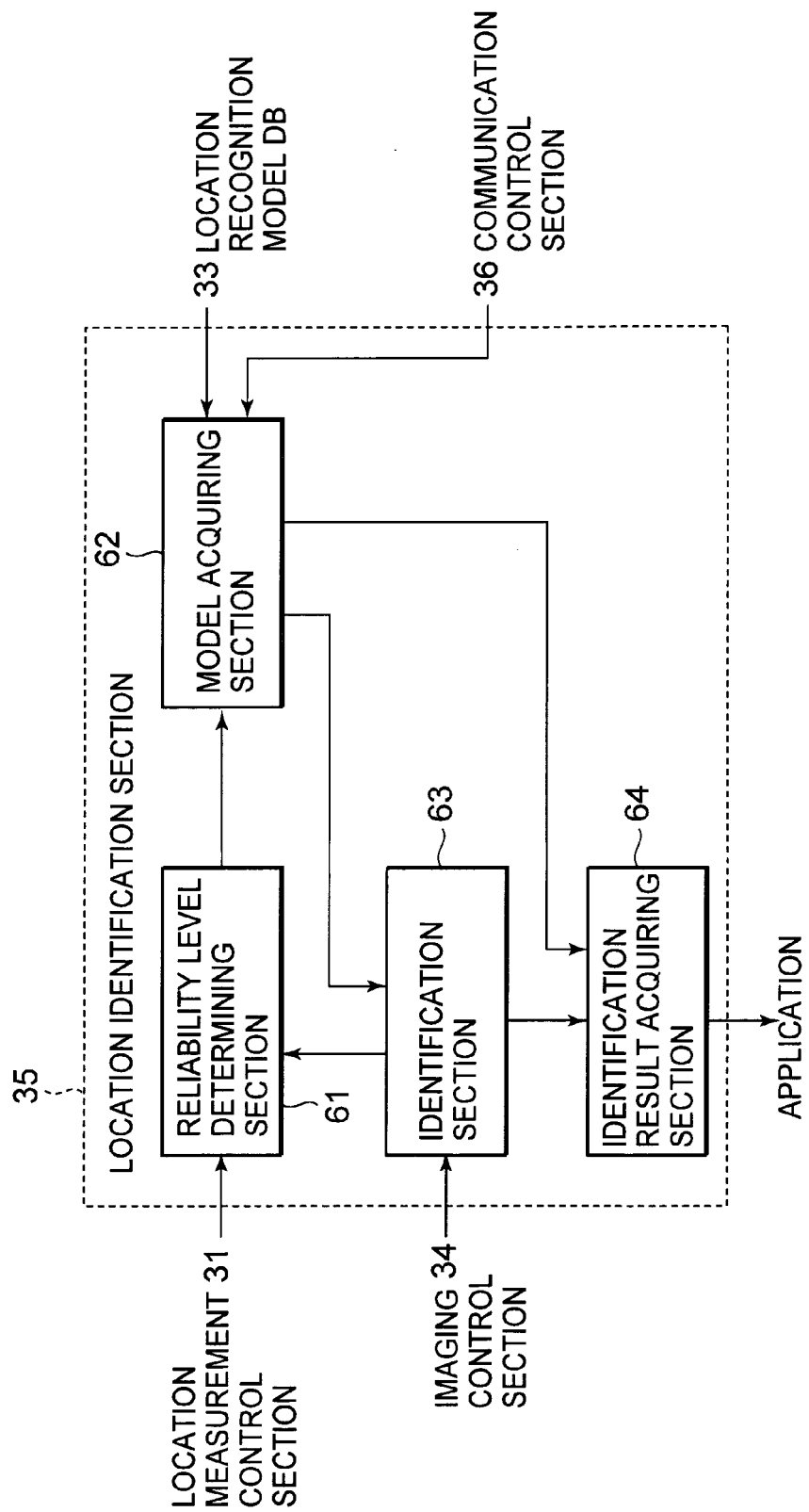
[FIG. 12]

FIG. 12 is a block diagram showing a detailed functional configuration example of the location identification section 35 in FIG. 6.

The location identification section 35 includes, for example, a reliability level determining section 61, a model acquiring section 62, an identification section 63, and an identification result acquiring section 64.

The reliability level determining section 61 determines how reliable the results of location measurements made by the GPS module 12 and the PHS module 13 are on the basis of information supplied thereto from the location measurement control section 31, and outputs more reliable one of the measurement results (longitude/latitude information) to the model acquiring section 62.

For example, having been supplied with information about the number of satellites acquired by the GPS module 12, and the like, information about the signal condition around a base station from which the PHS module 13 is receiving a signal, and the like, from the location measurement control section 31, the reliability level determining section 61 determines the reliability levels of the location measurement results on the basis of these pieces of information.

The reliability level determining section 61 also determines how reliable a location measurement result in the global area is, which is estimated by the identification section 63 on the basis of an image sequence taken by the camera. For example, in a case where a location measurement result estimated by the identification section 63 on the basis of an image sequence taken by the camera, is more reliable than a location measurement result by the GPS module 12 or the PHS module 13, the location measurement result by the identification section 63 is outputted to the model acquiring section 62 as the current location.

Figure 13:
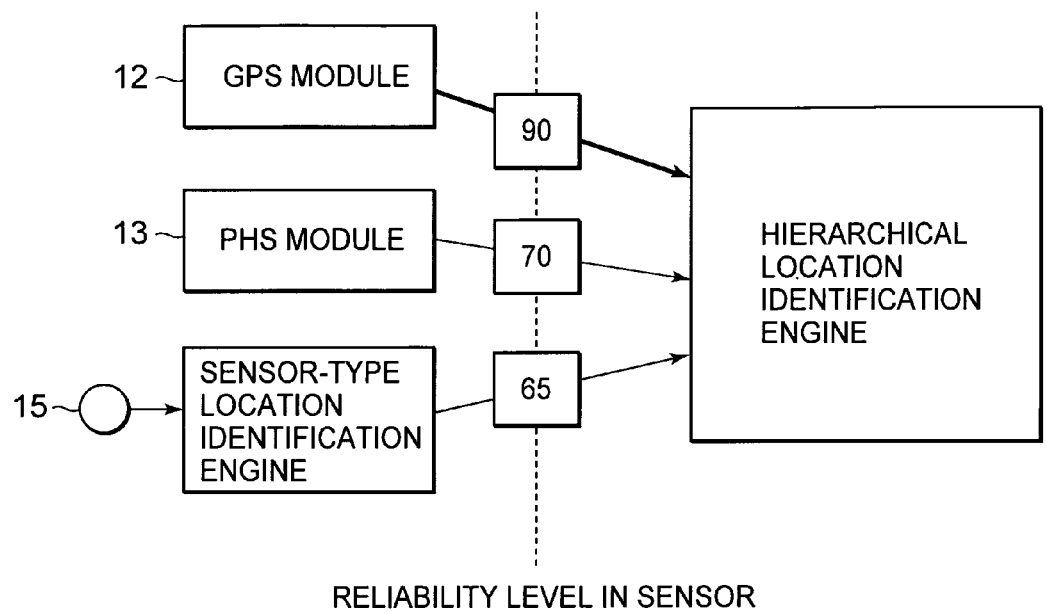
[FIG. 13]

FIG. 13 is a diagram illustrating an example of how a measurement result is selected on the basis of reliability levels.

As illustrated in, for example, FIG. 13, in a case where, given the maximum level as being 100, the reliability level of a location measurement result by the GPS module 12 is 90, the reliability level of a location measurement result by the PHS module 13 is 70, and the reliability level of a location measurement result by a sensor-type location identification engine (the identification section 63 that estimates a location from an image sequence taken by the camera 15 serving as a sensor) is 65, the location measurement result by the GPS module 12 exhibiting the highest level of reliability is selected, for use in location identification by a hierarchical location identification engine. This hierarchical location identification engine is an engine for performing the above-mentioned hierarchical location identification by the model acquiring section 62, identification section 63, and the like in FIG. 12.

In this way, since a location measurement result to be used for the subsequent processing is selected on the basis of reliability levels, more accurate location identification can be performed.

For example, in a place relatively remote from an urban area, where a signal is hard to receive from a base station, the reliability level of a location measurement result by the PHS module 13 drops, and thus a location measurement result by the GPS module 12 is to be used. Meanwhile, in a building or a train where a signal is hard to receive from a satellite, the reliability level of a location measurement result by the GPS module 12 drops, and thus a location measurement result by the PHS module 13 is to be used.

Returning to the description of FIG. 12, the model acquiring section 62 reads (acquires) an HMM associated with a cluster including the current location represented by longitude/latitude information supplied thereto from the reliability level determining section 61, from the location recognition model DB 33. For example, in FIG. 11, in a case where the current location in the global area has been recognized as being within the Home cluster from the longitude/latitude information obtained by the GPS module 12, the Home HMM associated with the Home cluster is read from the location recognition model DB 33.

Furthermore, in a case where an HMM associated with a cluster including the current location is not stored in the location recognition model DB 33, the model acquiring section 62 outputs the longitude/latitude information supplied thereto from the reliability level determining section 61, to the communication control section 36, for downloading the HMM corresponding to the cluster including the current location, from the server. The HMM downloaded from the server by the communication control section 36 is acquired by the model acquiring section 62.

The HMM thus acquired by the model acquiring section 62 is outputted to the identification section 63. For example, in a case where the HMM associated with the cluster including the current location cannot be acquired even from the server, the information about the current location (the information about the location measured by the GPS module 12 or the PHS module 13) supplied thereto from the reliability level determining section 61 or the information about the current location directly identified by the identification section 63 from the image sequence taken by the camera is supplied to the identification result acquiring section 64 without being further processed, to be adopted as the current location.

The identification section 63 performs identification of the current location in the local area on the basis of the HMM supplied thereto from the model acquiring section 62 and the image sequence supplied thereto from the imaging control section 34, and outputs the identification result to the identification result acquiring section 64.

Figure 14:
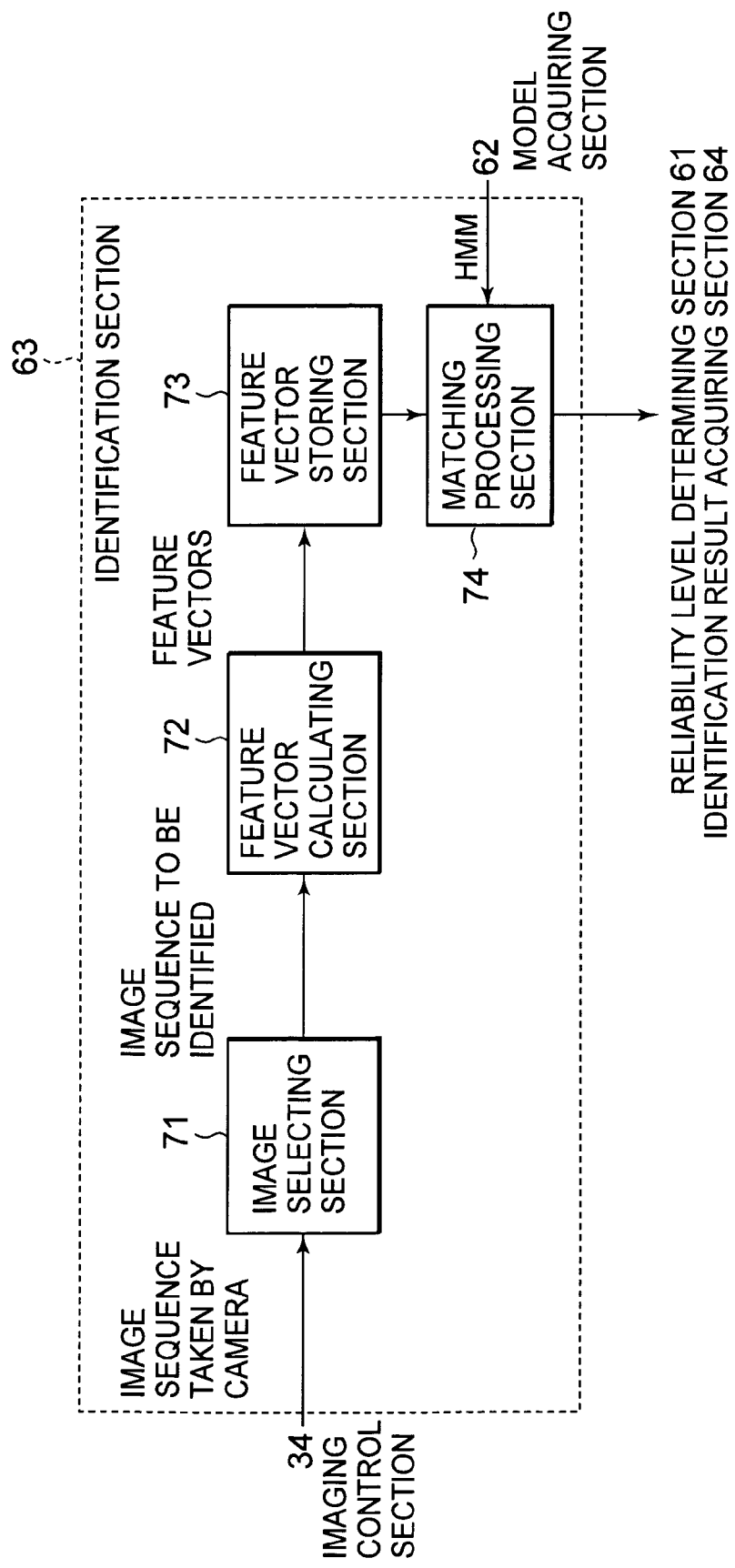
[FIG. 14]

FIG. 14 is a diagram showing a detailed functional configuration example of the identification section 63 in FIG. 12.

The identification section 63 includes an image selecting section 71, a feature vector calculating section 72, a feature vector storing section 73, and a matching processing section 74.

The image selecting section 71 selects images to be used in location identification in the local area, from images supplied thereto from the imaging control section 34 in the location identification phase, excluding images deemed unnecessary. The image selection by the image selecting section 71 is performed with the same algorithm as, for example, an algorithm for image selection by the model creating section 53.

Therefore, in a case where landscapes which are exactly the same have been imaged both in the location recognition model construction phase and in the location identification phase, the images (images for creating an HMM) selected by the model creating section 53 in the location recognition model construction phase are the same as the images (images to be identified for performing location identification) selected by the image selecting section 71 in the location identification phase. As a result of this, it becomes possible to perform local-area location identification in the location identification phase, while excluding unnecessary images.

The images selected by the image selecting section 71 are outputted to the feature vector calculating section 72.

The feature vector calculating section 72 calculates a feature vector (feature quantity) representing the feature of each of the images supplied thereto from the image selecting section 71, and stores the calculated feature vector in the feature vector storing section 73.

For example, the feature vector calculating section 72 finds a distance between an image $x_i$ supplied thereto from the image selecting section 71 and each of images $\{x_1, \ldots, x_M\}$ selected in the past by the image selecting section 71, and acquires a feature vector having these obtained distances as its elements. Namely, an M-dimensional feature vector represented by a below-described equation (2) is obtained.

[Equation 2]

$$d_i = \begin{bmatrix} D(x_i, x_1) \\ M \\ D(x_i, x_M) \end{bmatrix} \quad (2)$$

While D (x,y) is represented by a below-described equation (3), any other function can be used as long as it can represent a difference between two images x, y. In the equation (3), HW represents the maximum values both in height and width directions of a sensor number (the pixels of a CCD provided on the camera 15). Furthermore, 1 represents the pixel positions of an image, and c represents a color channel number (1, 2, 3 usually indicates red, green, and blue, respectively).

[Equation 3]

$$D(x, y) = \sum_{l}^{HW} \sum_{c}^{3} |x(l, c) - y(l, c)| \qquad (3)$$

The feature vector storing section 73 is formed of, for example, a circular buffer, and stores a predetermined number of feature vectors in order of their supply from the feature vector calculating section 72. The order in which the feature vectors are stored in the feature vector storing section 73 corresponds to a temporal order in which images to be identified have been taken by the camera.

Namely, what is stored in the feature vector storing section 73 is a time-sequential arrangement of the feature vectors, and if it is supposed that the latest one of these feature vectors is the "current" time, these vectors represent a transition with time of situations to the "current" time. Thus, a transition of situations to the "current" time represented by a predetermined number of feature vectors is subjected to matching with a transition of the "past" situations represented by the images corresponding to states of an HMM.

The matching processing section 74 performs Viterbi matching with an HMM supplied thereto from the model acquiring section 62, and calculates the matching level between a time series of the feature vectors stored in the feature vector storing section 73 and the states (a time series of feature vectors obtained from the images representing the states) of the HMM.

Here, the Viterbi matching (Viterbi algorithm) performed by the matching processing section 74 will be described.

The Viterbi algorithm provides a solution to a maximization problem such as mentioned below. In an equation (4) below, $s_i$ represents a state corresponding to an i-th image $x_i$, and $s^*_i$ represents an optimized state.

[Equation 4]

$$\{s^*_1, \ldots, s^*_N\} = \underset{\{s_1,\ldots,s_N\}}{\operatorname{argmax}} P(s_1, \ldots, s_N \mid H, \lambda) \qquad (4)$$

$$= \underset{\{s_1,\ldots,s_N\}}{\operatorname{argmax}} P(x_i \mid s_1) P(s_1) \prod_{j=2}^{N} P(x_{i-j} \mid s_j) P(x_j \mid s_{j-1})$$

Figure 15:
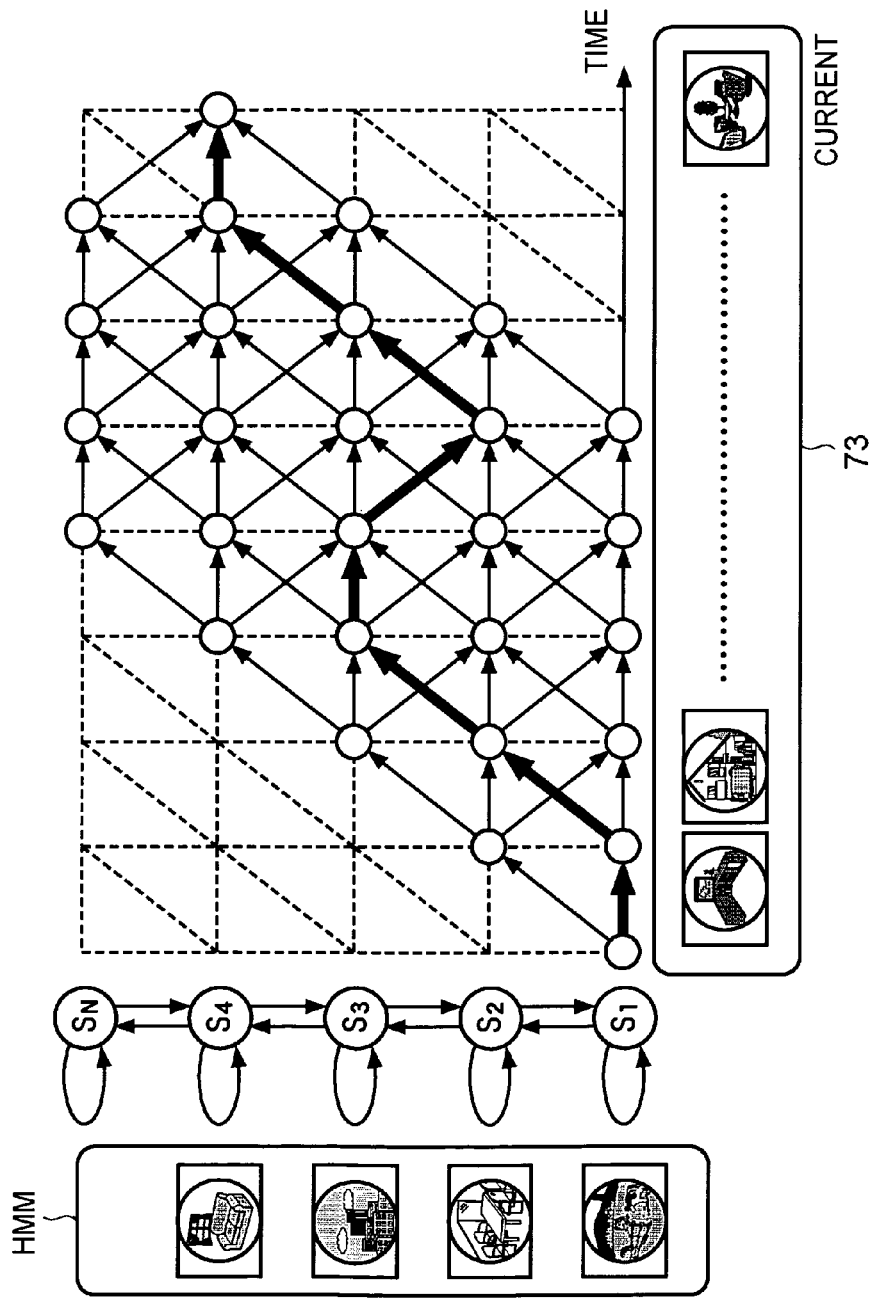
[FIG. 15]

As illustrated in FIG. 15, an optimized series of states for matching images represented as a matrix H of feature vectors stored in the feature vector storing section 73 with images representing states of an HMM supplied from the model acquiring section 62 is determined by the Viterbi algorithm, and probabilities obtained along the optimized series of states are acquired as the matching levels between the corresponding images, respectively. In the example of FIG. 15, a series of {S1, S1, S2, S3, S3, S2, S3, S4, S4} indicated by the thick arrow-headed lines is determined as the optimized series of states.

In the above, it has been described that the matching levels are obtained by the Viterbi matching. However, it can, of course, be configured to obtain the matching levels by other methods. Note that further details of Viterbi matching such as above are disclosed in Japanese Patent Application No. 2004-191308 by the present applicant.

Returning to the description of FIG. 12, the identification section 63 also identifies reversely the current location in the global area on the basis of the image sequence supplied thereto from the imaging control section 34, as necessary, and outputs the identification result to the reliability level determining section 61. In identifying the current location in the global area, the HMMs and the like stored in the location recognition model DB 33 are used as appropriate.

The identification result acquiring section 64 acquires information about the current location in the local area supplied thereto from the identification section 63 and information about the current location in the global area supplied thereto from the model acquiring section 62, and provides the acquired information to a predetermined application. For example, the application provides the user with information appropriate for the user's location on the basis of the information about the current location in the local area provided from the identification result acquiring section 64.

Next, operation of the portable terminal 1 having a configuration such as above will be described with reference to flowcharts.

Figure 16:
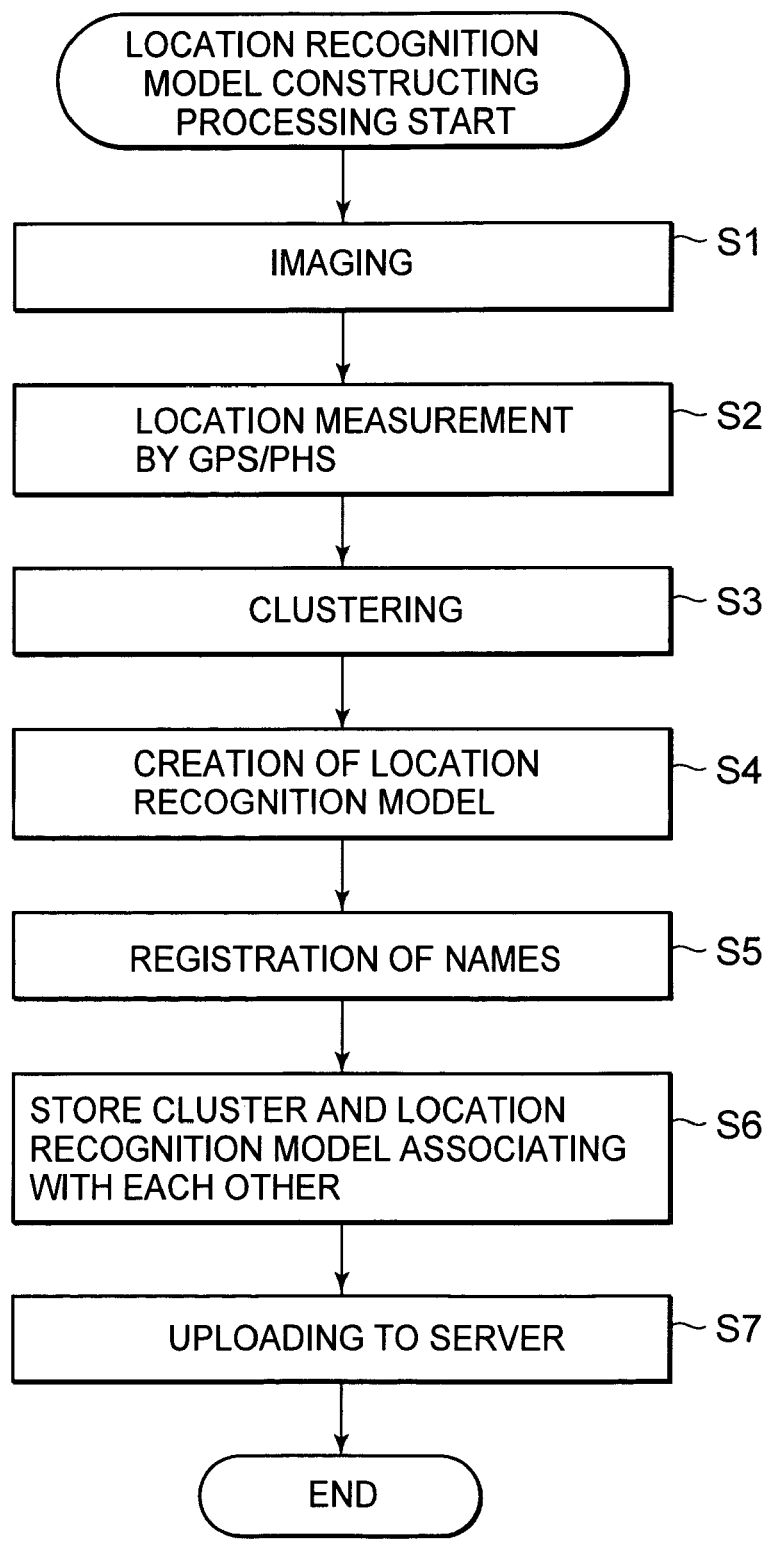
[FIG. 16]

Referring first to a flowchart of FIG. 16, location recognition model constructing processing performed by the portable terminal 1 in the location recognition model construction phase will be described.

In step S1, the imaging control section 34 of the information processing section 11 performs imaging with the camera 15, and outputs an obtained image sequence to the model creating section 53 of the registration managing section 32. The imaging is performed continuously at a rate such as, for example, 15 frames per second.

It may be configured such that the imaging is repeated until the user gives an instruction, or that the imaging is performed only at a place where imaging has never been performed before and the imaging can be ended when the user has moved to a place where imaging has been performed before. Judgment as to whether the current location is a place where imaging has been performed or not is made, for example, on the basis of a location measurement result by the GPS module 12 or the PHS module 13, and information stored in the location recognition model DB 33. Basically, the imaging is performed in parallel with processing in step S2 and forward.

In step S2, the location measurement control section 31 controls the GPS module 12 and the PHS module 13, and identifies the current location in the global area on the basis of information supplied thereto from these location measuring devices. The longitude/latitude information obtained by the location measurement control section 31 is outputted to the clustering section 51 of the registration managing section 32.

In step S3, the clustering section 51 performs clustering of the current location represented by the longitude/latitude information supplied thereto from the location measurement control section 31, and outputs information about a cluster including the current location, to the registration section 52.

The model creating section 53 creates, in step S4, an HMM on the basis of the image sequence supplied thereto from the imaging control section 34, and outputs the created HMM to the registration section 52. Here, as mentioned above, the selection of predetermined ones of the images supplied from the imaging control section 34, the association of the selected images with the states, and the like are performed. Note that the creation of the HMM may otherwise be performed at a predetermined later timing. In this case, the image sequence obtained by imaging and information about the location where the imaging has taken place are associated with each other to be stored in a predetermined storing section such as the location recognition model DB 33.

In step S5, the registration section 52 registers the names of a cluster and the like as necessary. For example, the registration section 52 displays images just taken on a display section (not shown) provided on the portable terminal 1, and prompts the user to give a name to the landscapes.

In step S6, the registration section 52 associates information about a cluster supplied thereto from the clustering section 51 and the HMM supplied thereto from the model creating section 52 with each other to store them in the location recognition model DB 33.

Furthermore, in step S7, the registration section 52 causes the communication control section 36 to upload the information about the cluster and the HMM to the server.

As a result of the above processing, the HMM is stored in the location recognition model DB 33 as associated with the cluster. Furthermore, the HMM becomes a shared resource on the server.

Figure 17:
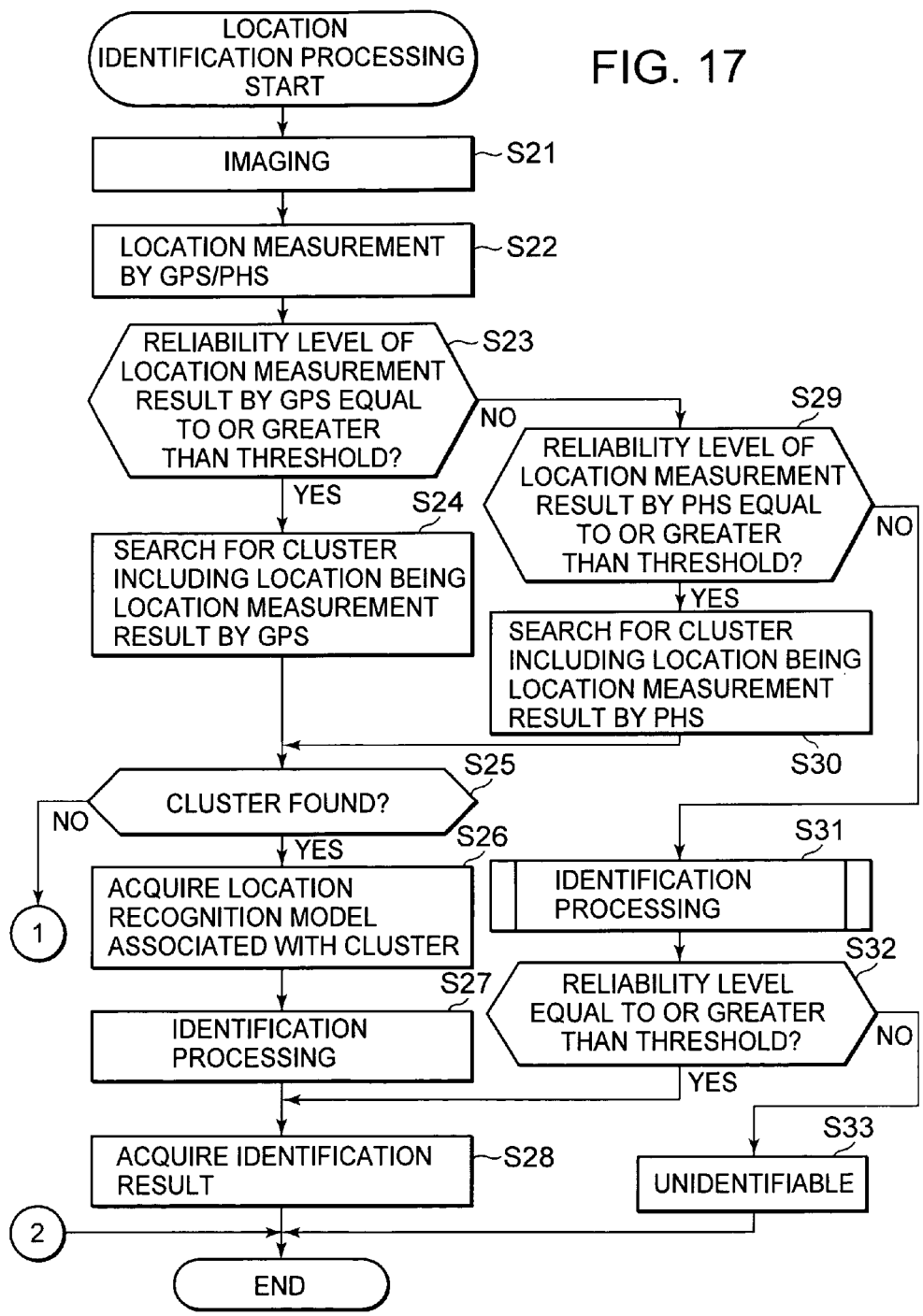
[FIG. 17]

Referring next to flowcharts of FIGS. 17 and 18, location identification processing performed by the portable terminal 1 in the location identification phase will be described.

In step S21, the imaging control section 34 of the information processing section 11 performs imaging with the camera 15, and outputs an image sequence taken thereby to the identification section 63 of the location identification section 35. The imaging here is repeated until so many frames of images as to allow the current location to be identified is obtained.

In step S22, the location measurement control section 31 controls the GPS module 12 and the PHS module 13, and identifies the current location in the global area on the basis of information supplied thereto from these location measuring devices. Longitude/latitude information obtained by the location measurement control section 31 is outputted to the reliability level determining section 61 of the location identification section 35.

The reliability level determining section 61 calculates, in step S23, the reliability level of a location measurement result by the GPS module 12 on the basis of the condition of a signal from a satellite, which has been received by the GPS module 12, and determines whether or not the calculated reliability level is equal to or greater than a predetermined threshold.

In a case where it has been determined in step S23 that the reliability level of the location measurement result by the GPS module 12 is equal to or greater than the threshold, the reliability level determining section 61 outputs longitude/latitude information being the location measurement result by the GPS module 12 to the model acquiring section 62, after which the processing proceeds to step S24.

In step S24, the model acquiring section 62 searches through the location recognition model DB 33 for a cluster including the current location represented by the longitude/latitude information supplied thereto from the reliability level determining section 61.

In a case where it has been determined by the model acquiring section 62 in step S25 that a cluster including the current location is found, the processing proceeds to step S26, in which the model acquiring section 62 acquires an HMM stored in association with the cluster from the location recognition model DB 33. The HMM acquired from the model acquiring section 63 is outputted by the identification section 63.

In step S27, the identification section 63 performs identification processing. The identification processing by the identification section 63 will be described with reference to a flowchart of FIG. 19. An identification result by the identification section 63 is outputted to the identification result acquiring section 64.

In step S28, the identification result acquiring section 64 acquires information about the current location in the local area being the identification result by the identification section 63, and then provides the information to a predetermined application or the like, thereby completing the processing.

Meanwhile, in a case where it has been determined by the reliability level determining section 61 in step S23 that the reliability level of the location measurement result by the GPS module 12 is smaller than the threshold, the processing proceeds to step S29, in which the reliability level determining section 61 then determines whether or not the reliability level of a location measurement result by the PHS module 13 is equal to or greater than a predetermined threshold, on the basis of the condition of a signal received from a base station, and the like.

In a case of having determined in step S29 that the reliability level of the location measurement result by the PHS module 13 is equal to or greater than the threshold, the reliability level determining section 61 outputs longitude/latitude information being the location measurement result by the PHS module 13, after which the processing proceeds to step S30.

In step S30, the model acquiring section 62 searches through the location recognition model DB 33 for a cluster including the current location represented by the longitude/latitude information supplied thereto from the reliability level determining section 61. Then, the processing proceeds to step S25 to perform the subsequent part of the processing.

Namely, in a case where the cluster including the current location is stored in the location recognition model DB 33, an HMM stored in association with the cluster is read from the location recognition model DB 33, and the HMM read is used to identify the current location in the local area.

Meanwhile, in a case where it has been determined by the reliability level determining section 61 in step S29 that the reliability level of the location measurement result by the PHS module 13 is smaller than the threshold, the processing proceeds to step S31. In step S31, the identification processing is performed by the identification section 63, similarly to step S27. Namely, in this case, the current location in the global area or the local area is to be directly identified from the image sequence taken by the camera.

In step S32, the reliability level determining section 61 determines whether or not the reliability level of the current location directly identified by the identification section 63 from the image sequence obtained by the camera is equal to or greater than a threshold, and in a case of positive result, the processing proceeds to step S28. In step S28, information about the current location directly identified from the image sequence taken by the camera is acquired from the identification result acquiring section 64, after which the processing is brought to an end.

In a case where it has been determined by the identification section 63 in step S32 that the reliability level of the current location directly identified from the image sequence taken by the camera is smaller than the threshold, the processing proceeds to step S33. In step S33, predetermined error processing is performed because the current location is deemed unrecognizable, after which the processing ends. For example, in a case where the place where the user has visited for the first time is a suburban area where the condition of a signal which the PHS is receiving from a base station is unsatisfactory, and additionally, is in a building where the condition of a signal being received from a satellite is also unsatisfactory, the error processing is to be performed.

Figure 18:
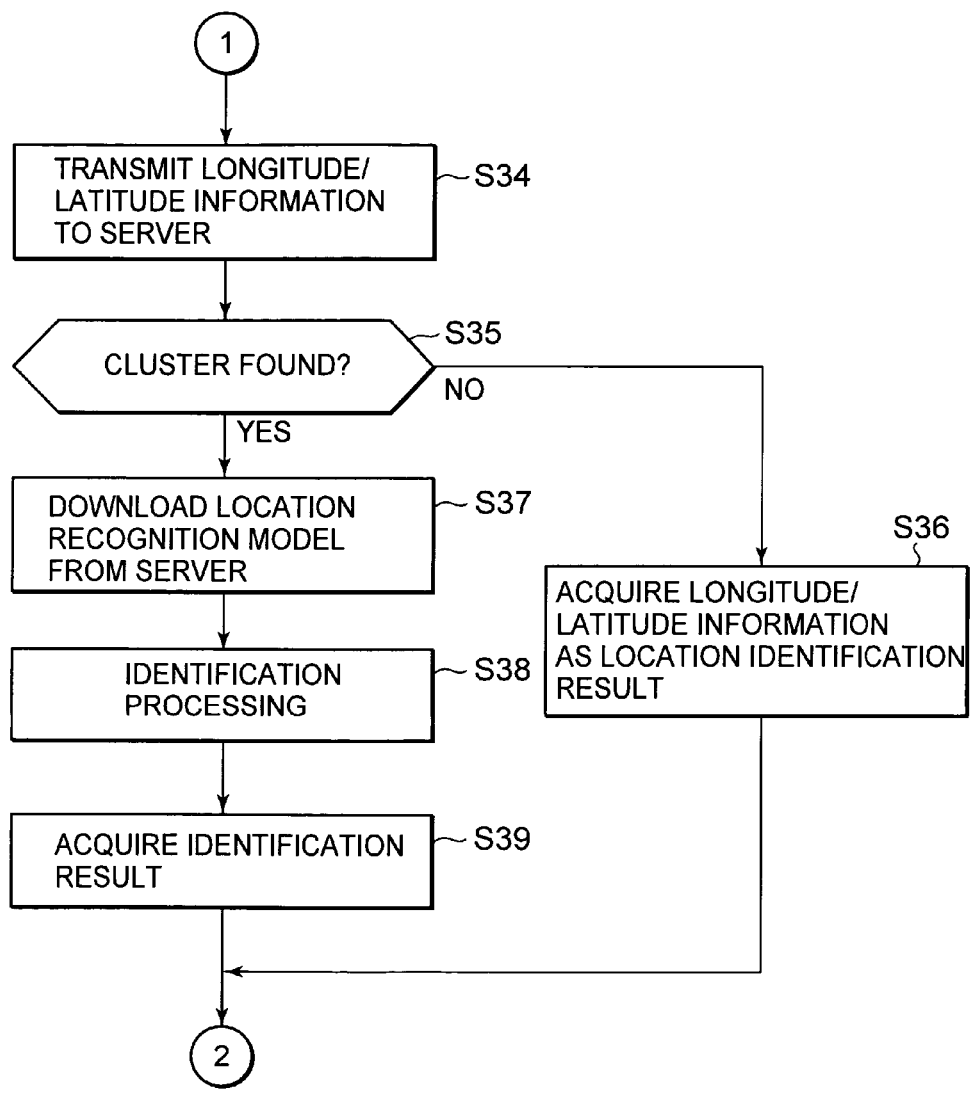
[FIG. 18]

Meanwhile, in a case of having determined in step S25 that the cluster including the current location being the location measurement result by the GPS module 12 or the current location being the location measurement result by the PHS module 13 is not stored in the location recognition model DB 33, the model acquiring section 62 outputs longitude/latitude information representing the current location to the communication control section 36, after which the processing proceeds to step S34 (FIG. 18).

In step S34, the communication control section 36 transmits the longitude/latitude information supplied thereto from the model acquiring section 62 to the server via the network.

In addition, the communication control section 36 determines, in step S35, whether or not the information about the cluster including the current location represented by the longitude/latitude information which it has transmitted is registered in the server. In a case of negative result, the processing proceeds to step S36. In this case, the location measurement result by the GPS module 12 or the location measurement result by the PHS module 13 is supplied to the identification result acquiring section 64 from the model acquiring section 62, and is acquired as the identification result as to the current location. Thereafter, the processing ends.

In a case of having determined in step S35 that the information about the cluster including the current location is registered in the server, the processing proceeds to step S37, in which the communication control section 36 downloads an HMM registered in association with the cluster. The HMM downloaded by the communication control section 36 is outputted to the identification section 63 via the model acquiring section 62.

In step S38, the identification section 63 performs the identification processing, similarly to step S27. An HMM used here in the identification processing is the one downloaded from the server. The identification result by the identification section 63 is acquired by the identification result acquiring section 64, after which the processing ends.

Figure 19:
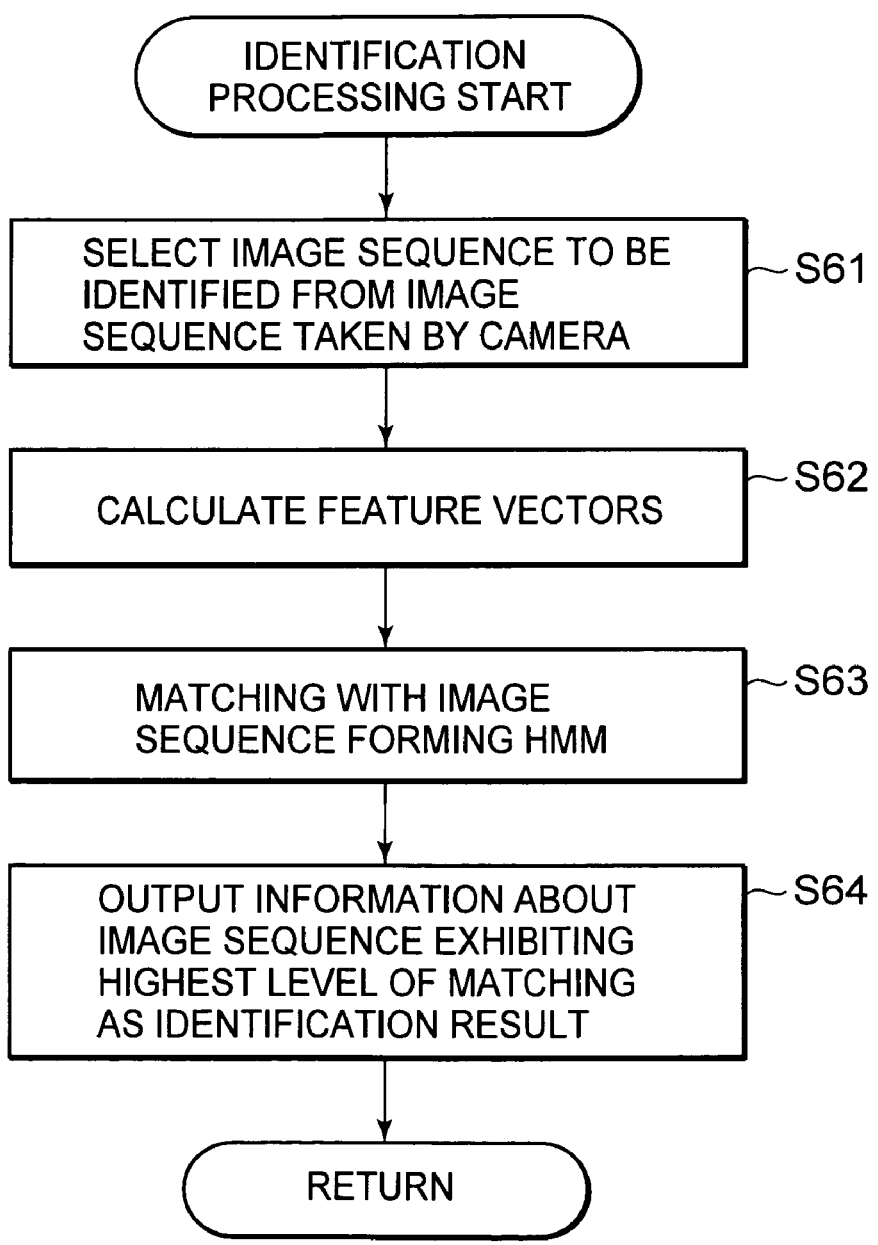
[FIG. 19]

Referring next to a flowchart of FIG. 19, the identification processing performed in steps S27, S31 of FIG. 17 and step S38 of FIG. 18 will be described.

In step S61, the image selecting section 71 (FIG. 14) of the identification section 63 selects images to be used in location identification in the local area, from among images supplied thereto from the imaging control section 34, and outputs an image sequence to be identified formed of the thus selected images, to the feature vector calculating section 72.

In step S62, the feature vector calculating section 72 calculates feature vectors representing the features of the images supplied thereto from the image selecting section 71, and stores the calculated feature vectors in the feature vector storing section 73. As a result of this, a time series of the feature vectors is stored in the feature vector storing section 73.

In step S63, the matching processing section 74 performs the Viterbi matching based on an HMM supplied thereto from the model acquiring section 62, and calculates matching levels between a time series of the feature vectors stored in the feature vector storing section 73 and states of the HMM (a time series of feature vectors obtained from images representing the states).

The matching processing section 74 outputs, in step S64, ID information and a name set to the image sequence of the HMM having the highest matching level, to the identification result acquiring section 64 as the identification result as to the current location in the local area, on the basis of the matching level calculation results. Thereafter, the processing returns to steps S27, S31 of FIG. 17, or step S38 of FIG. 18, in which the subsequent processing is performed.

Since the current location in the local area is identified through the above processing, the portable terminal 1 can be used in the following scenario.

Let it be supposed, for example, that when the user visited a tailor shop A in the department store near the station $S_2$ of FIG. 11 last time, he or she found a favorite suit of clothes, but decided not to purchase it at that time, and so the user took a memo (the user took a photo or stored a memo in text format), using the portable terminal 1, that he or she would purchase it next time. In this case, when the user visits the tailor shop A next time, and upon identification of his or her being in the tailor shop A by the portable terminal 1, the memo is to be presented.

As a result of this, the user can remember that he or she would purchase the suit of clothes at the tailor shop A. Note that the memo inputted by the user is stored in a system of the portable terminal 1 as a file, together with information for distinguishing the location of the tailor shop A.

Furthermore, since a location measurement result by the GPS module 12 and a location measurement result by the PHS module 13 can be switched according to their reliability levels, and moreover, even for a place where the user has visited for the first time, an HMM for performing location identification of that place can be downloaded from the server (in a case where the HMM has ever been registered in the server). Therefore, the portable terminal 1 can be used further in the following scenario.

For example, a user who has never visited Shinagawa Station $S_5$ of FIG. 11 has an appointment to see a friend on the Shinagawa Station $S_5$ yard.

In the portable terminal 1 of this user, longitude/latitude information is periodically acquired by the GPS module 12 and the PHS module 13. Since a signal from a satellite is hard to receive (navigation messages cannot be acquired) by the GPS module 12 on the Shinagawa Station $S_5$ yard, the GPS module 12 notifies the system (the information processing section 11) of the portable terminal 1 that the reliability level has dropped.

In response thereto, the system of the portable terminal 1 compares the reliability level in the GPS module 12 with the reliability level in the PHS module 13. In the case of the PHS, a signal is receivable from a base station, for example, even in the Shinagawa Station $S_5$ yard, and thus the reliability level is high. Therefore, the output from the PHS module 13 is used as the location measurement result in the global area.

The system of the portable terminal 1 searches through the location recognition model DB 33 for a cluster including Shinagawa Station $S_5$ using longitude/latitude information being the location measurement result by the PHS module 13. However, because the user has never been to Shinagawa Station $S_5$, the cluster does not exist.

In this case, the system of the portable terminal 1 sends a request for an HMM to the server on the network (transmits the longitude/latitude information identified by the PHS module 13), and in a case where the HMM created by the portable terminal of another user exists on the server, the system downloads that HMM, for use in location identification on the Shinagawa Station $S_5$ yard.

As a result of this, the user can check if he or she is heading toward the East Exit or the West Exit on the Shinagawa Station $S_5$ yard, and the like, as navigated by the portable terminal 1, and thus can see the friend even in a place strange to him or her.

Note that in the case of the above-mentioned location identification engine, the substance of an HMM is its parameters or feature vectors which cannot be restored later as photos or images, and this means that personal information (for example, where the user visited, what the user purchased, and the like) cannot be extracted from these data. Therefore, as long as the HMM is exchanged, it can be said that the risk of sharing data is extremely low also from the viewpoint of privacy protection. Furthermore, since the data size is some tens of kilobytes to some megabytes, data transmission can be performed easily.

By taking advantage of a property such as this, the portable terminal 1 can be used still further in the following scenario.

For example, let a navigation be considered at Hakuba Station where a certain user has visited for the first time.

Naturally, the location recognition model for Hakuba Station does not exist in the portable terminal 1 of this user. Hence, the user requests the server to transmit an HMM being the location recognition model for Hakuba Station, but the HMM for Hakuba Station has not been registered in the server yet.

In this case, the portable terminal 1 of the user broadcasts a request for the HMM for Hakuba Station to a plurality of terminals on the network, using wireless communication means such as a wireless LAN. If a portable terminal 2 of a resident near Hakuba Station who already has the HMM for Hakuba Station is among terminals around the portable terminal 1 which have received the request from the portable terminal 1, the portable terminal 2 searches through recognition models which it holds for the HMM for Hakuba Station, on the basis of location information about Hakuba Station transmitted thereto together with the request from the portable terminal 1. And the portable terminal 2 gives reply that it holds the HMM for Hakuba Station, to the portable terminal 1.

The portable terminal 1 having received the reply from the portable terminal 2 connects to the portable terminal 2 in an ad hoc mode to download the HMM for Hakuba Station from the portable terminal 2.

In this way, even in a case where a desired location recognition model is not registered in the server when the user needs navigation thereby, the location recognition model can be shared on a so-called peer-to-peer system, i.e., the location recognition model can be exchanged directly between individuals.

By repeating processing of acquiring an HMM from another terminal such as mentioned above in the portable terminal 1, the user can be navigated from Hakuba Station to another destination.

For example, when the user leaves Hakuba Station to head for a new destination, a new HMM is needed in order to navigate the user from Hakuba Station. The portable terminal 1 of the user which has already acquired the HMM for Hakuba Station continuously performs location identification using the Hakuba Station HMM, as long as it is within the range of the longitude/latitude registered in association with the Hakuba Station HMM. However, in a case where the user goes beyond this range, that is, in a case where the current location measured using the GPS module or the PHS module is beyond the range identifiable by the HMM held, the location identification can no longer be performed. Thus, the portable terminal 1 of the user transmits longitude/latitude information about the current location to the surrounding terminals, to make a request for a new HMM. The series of processing is repeated as appropriate until the user arrives at the destination.

Alternatively, it can be configured such that the request for an HMM to the surrounding terminals is repeated at predetermined time intervals, without comparing the HMM held with the longitude/latitude information measured.

In the above, the portable terminal 1 is hexagonal in cross-section, as shown in FIG. 5. However, its shape is not, of course, limited to this.

FIGS. 20A to 20D, and FIGS. 21A to 21D show other examples as to the shape of the portable terminal 1.

Figure 20A:
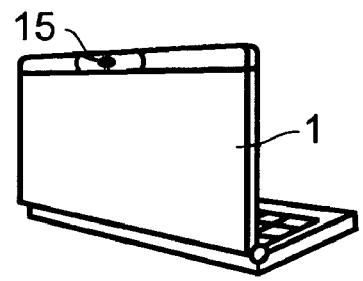
[FIG. 20A]
Figure 20B:
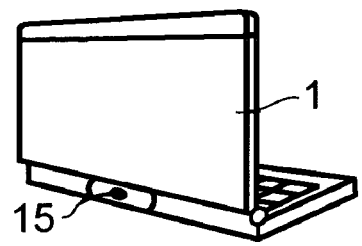
[FIG. 20B]

For example, as shown in FIGS. 20A and 20B, the portable terminal 1 may be a notebook-type personal computer. In this case, the camera 15 is provided such that it is located at an upper part of the computer when the computer is opened as shown in FIG. 20A, or provided at the hinge as shown in FIG. 20B.

Figure 20C:
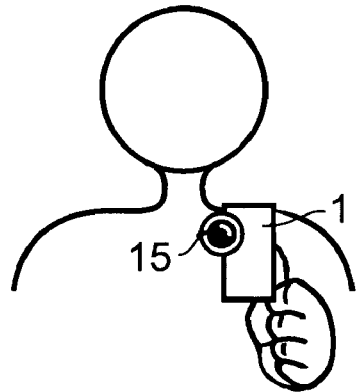
[FIG. 20C]
Figure 20D:
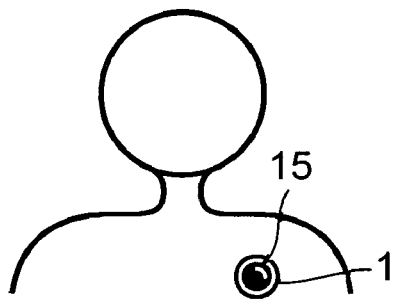
[FIG. 20D]

FIG. 20C shows the portable terminal 1 having a shape such as a small-sized video camera, and FIG. 20D shows the portable terminal 1 having a shape such that it can be put on clothes like a badge.

Figure 21A:
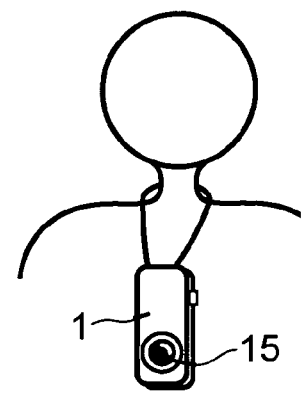
[FIG. 21A]
Figure 21B:
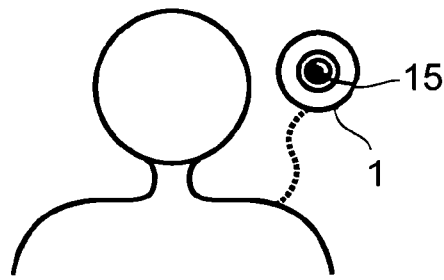
[FIG. 21B]

Furthermore, FIG. 21A shows the portable terminal 1 of a neck strap type, and FIG. 21B shows the portable terminal 1 of a balloon type. The portable terminal 1 of the balloon type is realized so as to be incorporated into, for example, something like balloon.

Figure 21C:
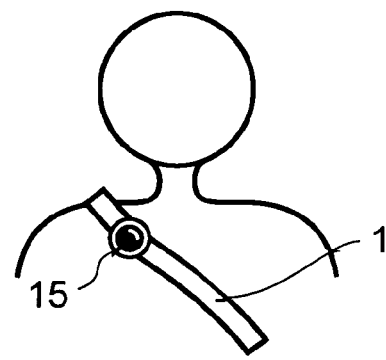
[FIG. 21C]
Figure 21D:
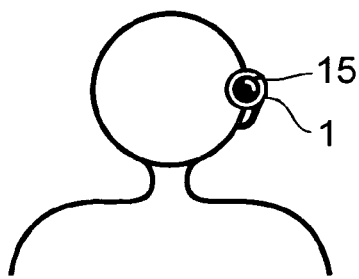
[FIG. 21D]

FIG. 21C shows a belt-shaped portable terminal 1 for use as being obliquely hung on the shoulder such as a shoulder bag, and FIG. 21D shows a headset type portable terminal 1.

In this way, the portable terminal 1 can have various shapes.

Furthermore, while location identification based on HMMs is performed in the above, the present invention is applicable to location identification based on other algorithms as well. For example, location recognition models such as a neural network, a perception, a SVM (Support Vector Machine), and the like can be used.

Furthermore, while the location measuring device incorporated in the portable terminal 1 together with the GPS is the PHS in the above, any device may be applicable, as long as the device has a function by which location measurements can be made on the basis of information transmitted thereto from any of base stations which are established in areas remote from each other some hundreds of meters.

Furthermore, while hierarchical location identification is used to present predetermined information to a user in the above, this location identification is not limited to that use. It may also be used in, for example, a navigation systems incorporated into a passenger car.

As a result of this, for example, even if a user is driving along an ordinary road below an overhead highway that runs in parallel therewith, the user can be navigated along the ordinary road in a manner more appropriate for the situation. Namely, in a case of navigated only on the basis of location measurement results by the GPS, even when the user is actually driving along the ordinary road, the user may be navigated as if the user were driving on the highway on a map displayed. However, such an erroneous navigation can be prevented.

Note that in navigation systems for passenger cars or the like, it may be considered to acquire location recognition models on a real-time basis by use of, for example, the VICS (Vehicle Information and Communication System), i.e., the traffic information communication system. In this case, the acquisition of a location recognition model may be performed automatically when a passenger car has arrived within a beacon receiving area established at predetermined locations along a road, or it may be configured to receive a location recognition model transmitted as multiplexed into a broadcasting signal from an FM broadcasting station, at predetermined intervals.

In the above, an HMM which is associated with a cluster selected on the basis of a location measurement result by the GPS module 12 or the PHS module 13 is used for location identification in the local area. However, it may otherwise be configured such that the HMM is directly associated with longitude/latitude information being a location measurement result in the location recognition model construction phase by the GPS module 12 or the PHS module 13. In this case, in the location identification phase, an HMM associated with, for example, the longitude/latitude information closest to the current location obtained by a location measurement by the GPS module 12 or the like is selected, and is used for location identification in the local area.

Furthermore, in the above, HMMs are created and location identification in the local area is performed on the basis of images (for example, images obtained by the camera with their resolution lowered) taken by the camera 15 having an imaging device such as a CCD. However, since the resolution of the images used for these processing may be low as mentioned above, an optical sensor array including a plurality of optical sensors may be provided on the camera 15, in place of the imaging device such as a CCD.

For example, if an array of 5×5 optical sensors is provided in place of the imaging device, the matching levels can be calculated from change with time of the outputs of the respective optical sensors. Furthermore, depending on the number of optical sensors arrayed, power consumption can be suppressed compared with the case where a CCD is driven. Therefore, in the above description, besides optical information obtained from a CCD, optical information obtained from individual optical sensors is included in the "images" obtained by the camera 15.

The series of processing mentioned above may be executed by hardware, but may be executed by software as well. In this case, an apparatus for executing the software is formed of a personal computer such as shown in FIG. 22.

In FIG. 22, a CPU 101 executes various processing according to programs stored in a ROM 102 or programs loaded from a storing section 108 to a RAM 103. The RAM 103 stores therein data and the like necessary for the CPU 101 to execute the various processing, as appropriate.

The CPU 101, ROM 102, and RAM 103 are interconnected via a bus 104. The bus 104 has also an input/output interface 105 connected thereto.

To the input/output interface 105, there are connected an input section 106 such as a keyboard and a mouse, an output section 107 including a display such as an LCD (Liquid Crystal Display) and speakers and the like, the storing section 108 formed of a hard disk or the like, and a communication section 109 for performing communication processing via a network.

To the input/output interface 105, a drive 110 is further connected, as necessary, into which a removable medium 111, such as a magnetic disk, an optical disc, a magneto-optical disc, or a semiconductor memory, is inserted as appropriate. A computer program read from the removable medium 111 is installed in the storing section 108 as necessary.

In a case where the series of processing is executed by software, a program forming the software is installed in a computer incorporated into dedicated hardware, or in, for example, a general-purpose personal computer or the like which can execute various functions by installing various programs therein, from a recording medium.

This recording medium includes, as shown in FIG. 22, not only the removable medium 111 being a package medium formed of a magnetic disc (including a flexible disc), an optical disc (including a CD-ROM (Compact Disk-Read Only Memory) and a DVD (Digital Versatile Disk)), a magneto-optical disc (including an MD (trademark) (Mini-Disk)), or a semiconductor memory, which has the program recorded therein and which is distributed, separate from the main apparatus, in order to provide the program to a user, but also the ROM 102 and a hard disk included in the storing section 108, which have the program recorded therein and which are provided to the user as incorporated into the main apparatus beforehand.

Note that in the present description, each of the steps includes not only processing performed time-sequentially according to sequences described, but also processing performed parallely or individually, if not time-sequentially.

The invention claimed is:

1. An information processing device, comprising:
   a location measuring unit configured to make a location measurement and determine a first location of the information processing device;
   an acquisition unit configured to acquire data for recognition for performing location identification, which includes a model including image data corresponding to the first location determined by the location measuring unit, on the basis of location information obtained by the location measurement made by said location measuring unit;
   an image sensor configured to acquire image data of surroundings of the information processing device;
   a location identification unit configured to identify a second location within said first location by comparing the acquired image data to the model corresponding to the first location; and
   a creating unit configured to create said data for recognition on the basis of an output of said image sensor;
   a memory configured to store said data for recognition created by said creating unit while associating the data for recognition with the location information obtained by the location measurement unit,
   wherein the acquisition unit is configured to acquire said data for recognition from said memory based on the location information obtained by the location measurement unit, and
   in a case where:
      the location information obtained by the location measurement made by said location measuring unit is represented by a predetermined location coordinate, and
      the location information stored in said memory in association with said data for recognition is represented by a predetermined location coordinate range,
   said acquisition unit acquires said data for recognition from a device remotely connected to the information processing device, when the location coordinate obtained by the location measurement made by said location measuring unit exceeds said predetermined location coordinate range.

2. The information processing device according to claim 1, further comprising:
   a transmitter configured to transmit said data for recognition to a server remotely connected to the information processing device.

3. The information processing device according to claim 2, further comprising:
   a receiver configured to receive the data for recognition from said server remotely connected to the information processing device; and
   a searching unit configured to search for said data for recognition on the basis of said location information, wherein said transmitter is configured to transmit said data for recognition searched by said searching unit to said server remotely connected to the information processing device.

4. The information processing device according to claim 1, wherein:
said acquisition unit is configured to acquire said data for recognition from a server remotely connected to the information processing device if said data for recognition corresponding to the location information obtained by the location measurement made by said location measuring means is not stored by said memory.

5. The information processing device according to claim 1, wherein said acquisition unit is configured to acquire said data for recognition at predetermined time intervals.

6. The information processing device according to claim 1, wherein:
said location measuring unit is configured to make location measurements using a GPS and a PHS, and selects, from a location obtained by using the GPS and a location obtained by using the PHS, the location exhibiting a higher reliability level as a location measurement result.

7. The information processing device according to claim 1, wherein
said image sensor includes a camera or a plurality of optical sensors.

8. An information processing method, comprising:
measuring, at a location measurement unit of an information processing device, a location of the information processing device and determining a first location of the information processing device based on the location measurement;
acquiring data for recognition for performing location identification, which includes a model including image data corresponding to the first location determined by the location measuring unit, on the basis of location information obtained by the location measurement;
acquiring, at an image sensor of the information processing device, image data of surroundings of the information processing device;
performing location identification of identifying a second location within the first location by comparing the acquired image data to the model corresponding to the first location;
creating said data for recognition on the basis of an output of said image sensor; and
storing, at a memory of the information processing device, said created data for recognition while associating the data for recognition with the location information obtained by the location measurement unit,
wherein the acquiring includes acquiring said data for recognition from said memory based on the location information obtained by the location measurement unit, and
in a case where:
the location information obtained by the location measurement made by said location measuring unit is represented by a predetermined location coordinate, and
the location information stored in said memory in association with said data for recognition is represented by a predetermined location coordinate range,
said acquiring includes acquiring said data for recognition from a device remotely connected to the information processing device, when the location coordinate obtained by the location measurement made by said location measuring unit exceeds said predetermined location coordinate range.

9. A computer-readable recording medium including a program, which when executed by an information processing device, causes the information processing device to perform a method, comprising:
measuring, at a location measurement unit of the information processing device, a location of the information processing device and determining a first location of the information processing device based on the location measurement;
acquiring data for recognition for performing location identification, which includes a model including image data corresponding to the first location determined by the location measuring unit, on the basis of location information obtained by the location measurement;
acquiring, at an image sensor of the information processing device, image data of surroundings of the information processing device; and
performing location identification of identifying a second location within the first location by comparing the acquired image data to the model corresponding to the first location;
creating said data for recognition on the basis of an output of said image sensor; and
storing, at a memory of the information processing device, said created data for recognition while associating the data for recognition with the location information obtained by the location measurement unit,
wherein the acquiring includes acquiring said data for recognition from said memory based on the location information obtained by the location measurement unit, and
in a case where:
the location information obtained by the location measurement made by said location measuring unit is represented by a predetermined location coordinate, and
the location information stored in said memory in association with said data for recognition is represented by a predetermined location coordinate range,
said acquiring includes acquiring said data for recognition from a device remotely connected to the information processing device, when the location coordinate obtained by the location measurement made by said location measuring unit exceeds said predetermined location coordinate range.

* * * * *